United States Patent
Tsuchida et al.

(10) Patent No.: US 10,602,312 B2
(45) Date of Patent: Mar. 24, 2020

(54) CONTENT DELIVERY SYSTEM, CONTENT DELIVERY SERVER, IN-VEHICLE TERMINAL, CONTENT DELIVERY METHOD

(71) Applicant: Clarion Co., Ltd., Saitama-shi, Saitama (JP)

(72) Inventors: Gen Tsuchida, Tokyo (JP); Daisuke Matsubara, Tokyo (JP); Yasushi Nagai, Saitama (JP); Kyousuke Tsurusu, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 217 days.

(21) Appl. No.: 15/571,090

(22) PCT Filed: Mar. 14, 2016

(86) PCT No.: PCT/JP2016/057940
§ 371 (c)(1),
(2) Date: Nov. 1, 2017

(87) PCT Pub. No.: WO2016/189931
PCT Pub. Date: Dec. 1, 2016

(65) Prior Publication Data
US 2018/0167789 A1 Jun. 14, 2018

(30) Foreign Application Priority Data
May 27, 2015 (JP) ................................ 2015-107091

(51) Int. Cl.
*H04W 4/02* (2018.01)
*H04W 4/029* (2018.01)
(Continued)

(52) U.S. Cl.
CPC ............ *H04W 4/025* (2013.01); *G06F 13/00* (2013.01); *G08G 1/09* (2013.01); *G08G 1/13* (2013.01);
(Continued)

(58) Field of Classification Search
CPC ....... H04W 4/025; H04W 4/44; H04W 4/029; G06F 13/00; G08G 1/09; G08G 1/13; H04L 67/26; H04L 67/2847; H04L 67/327
See application file for complete search history.

(56) References Cited

U.S. PATENT DOCUMENTS 6,597,906 B1  7/2003  Van Leeuwen et al.
9,680,719 B2 *  6/2017  Hato ..................... H04L 43/045
(Continued)

FOREIGN PATENT DOCUMENTS

EP  1 737 160 A1  12/2006
JP  2002-116032 A  4/2002
(Continued)

OTHER PUBLICATIONS

Extended European Search Report issued in counterpart European Application No. 16799639.6 dated Sep. 24, 2018 (nine (9) pages).
(Continued)

*Primary Examiner* — Arvin Eskandarnia
(74) *Attorney, Agent, or Firm* — Crowell & Moring LLP

(57) ABSTRACT

Provided is a content delivery system which includes an in-vehicle terminal and a content delivery server connected via wireless communication. The content delivery server includes a pre-sending unit which identifies a content that is likely to be used by the in-vehicle terminal in a dead spot where a communication status of the wireless communication is inferior, and sends the identified content to the in-vehicle terminal before a vehicle mounted with the in-vehicle terminal reaches the dead spot. The in-vehicle terminal includes an in-vehicle terminal storage unit which stores the content sent from the pre-sending unit.

10 Claims, 16 Drawing Sheets

(51) Int. Cl.
*H04W 4/44* (2018.01)
*G06F 13/00* (2006.01)
*G08G 1/09* (2006.01)
*G08G 1/13* (2006.01)
*H04L 29/08* (2006.01)

(52) U.S. Cl.
CPC .......... *H04L 67/26* (2013.01); *H04L 67/2847* (2013.01); *H04L 67/327* (2013.01); *H04W 4/029* (2018.02); *H04W 4/44* (2018.02); *H04L 67/22* (2013.01)

(56) References Cited

U.S. PATENT DOCUMENTS

| | | |
|---|---|---|
| 2006/0277308 A1 | 12/2006 | Morse et al. |
| 2007/0067415 A1* | 3/2007 | Kawaguchi ........ G01C 21/3697 709/217 |
| 2011/0131037 A1* | 6/2011 | Huang ................ B60R 16/0373 704/10 |
| 2011/0167128 A1 | 7/2011 | Raghunathan et al. |
| 2011/0176476 A1* | 7/2011 | Tsuruoka ............... H04B 7/155 370/315 |
| 2011/0288936 A1 | 11/2011 | Cumming |
| 2015/0181417 A1* | 6/2015 | Snider ................... H04L 67/125 370/338 |

FOREIGN PATENT DOCUMENTS

| | | |
|---|---|---|
| JP | 2006-78872 A | 3/2006 |
| JP | 2008-170277 A | 7/2008 |
| JP | 2015-64366 A | 4/2015 |

OTHER PUBLICATIONS

International Search Report (PCT/ISA/210) issued in PCT Application No. PCT/JP2016/057940 dated Apr. 5, 2016 with English translation (5 pages).

Japanese-language Written Opinion (PCT/ISA/237) issued in PCT Application No. PCT/JP2016/057940 dated Apr. 5, 2016 (4 pages).

* cited by examiner

| Time | Name | Location Of Execution | Radio Field Strength | Download Speed | Download Time |
|---|---|---|---|---|---|
| 2015/2/3 9:10 | Content A | (35.12, 139.01) | −55dBm | 500 kbps | 35s |
| 2015/2/4 11:30 | Content C | (34.99, 138.99) | −90dBm | 10 kbps | 200s |
| . | . | . | . | . | . |

16b

CONTENT DELIVERY SYSTEM, CONTENT DELIVERY SERVER, IN-VEHICLE TERMINAL, CONTENT DELIVERY METHOD

TECHNICAL FIELD

The present invention relates to a content delivery system, a content delivery server, an in-vehicle terminal, and a content delivery method.

BACKGROUND ART

There are needs of users to use arbitrary contents by using a terminal installed in a running vehicle. PTL 1 discloses a system which deliveries the user's selected content by using a public wireless LAN service, or a so-called hot spot, on a travel route.

CITATION LIST

Patent Literature

[PTL 1] Specification of European Patent Application Publication No. 1737160

SUMMARY OF THE INVENTION

Problems to Be Solved By the Invention

With the invention described in PTL 1, contents cannot be used at locations where the communication status is inferior.

Means to Solve the Problems

According to the first mode of the present invention, a content delivery system includes an in-vehicle terminal and a content delivery server connected via wireless communication, wherein the content delivery server includes a pre-sending unit which identifies a content that is likely to be used by the in-vehicle terminal in a dead spot where a communication status of the wireless communication is inferior, and sends the identified content to the in-vehicle terminal before a vehicle mounted with the in-vehicle terminal reaches the dead spot, and wherein the in-vehicle terminal includes an in-vehicle terminal storage unit which stores the content sent from the pre-sending unit.

According to the second mode of the present invention, a content delivery server configures the content delivery system of the first mode.

According to the third mode of the present invention, an in-vehicle terminal mounted in a vehicle includes: an input unit which is used by a user for selecting a content to be used; a communication unit which acquires the selected content from a content delivery server via wireless communication; an action history acquisition unit which sends action history information related to a communication status of the wireless communication and a position of the vehicle when a content was acquired from the content delivery server; a content pre-acquisition unit which acquires a content to be used by the in-vehicle terminal at a spot where a communication status of the wireless communication is inferior; a content storage unit which stores the content acquired by the content pre-acquisition unit; and a control unit which uses a content stored in the content storage unit when the selected content is stored in the content storage unit, and acquires and uses a content by using the communication unit when the selected content is not stored in the content storage unit.

According to the fourth mode of the present invention, a content delivery method of delivering a content to an in-vehicle terminal via wireless communication includes the steps of: identifying a content that is likely to be used by the in-vehicle terminal in a dead spot where a communication status of the wireless communication is inferior; and sending the identified content to the in-vehicle terminal before a vehicle mounted with the in-vehicle terminal reaches the dead spot.

Advantageous Effects of the Invention

According to the present invention, contents can be used even at locations where the communication status is inferior.

DESCRIPTION OF EMBODIMENTS (Overview of Invention and Definition of Terms)

Contents that are used in an in-vehicle terminal or a portable terminal are not only sent from a server based on a users operation of the terminal, they are also sent from a server even without an express request from a user based on predetermined processing. The action of the server sending and storing contents without an express request from a user is referred to as "push delivery" (or simply "push") in this specification. A storage area which stores the contents that were pushed by a server is hereinafter referred to as a "cache". In other words, even in a state where communication with other equipment is not possible, the in-vehicle terminal can read a content from the cache of the in-vehicle terminal and use the content.

First Embodiment

Figure 1:
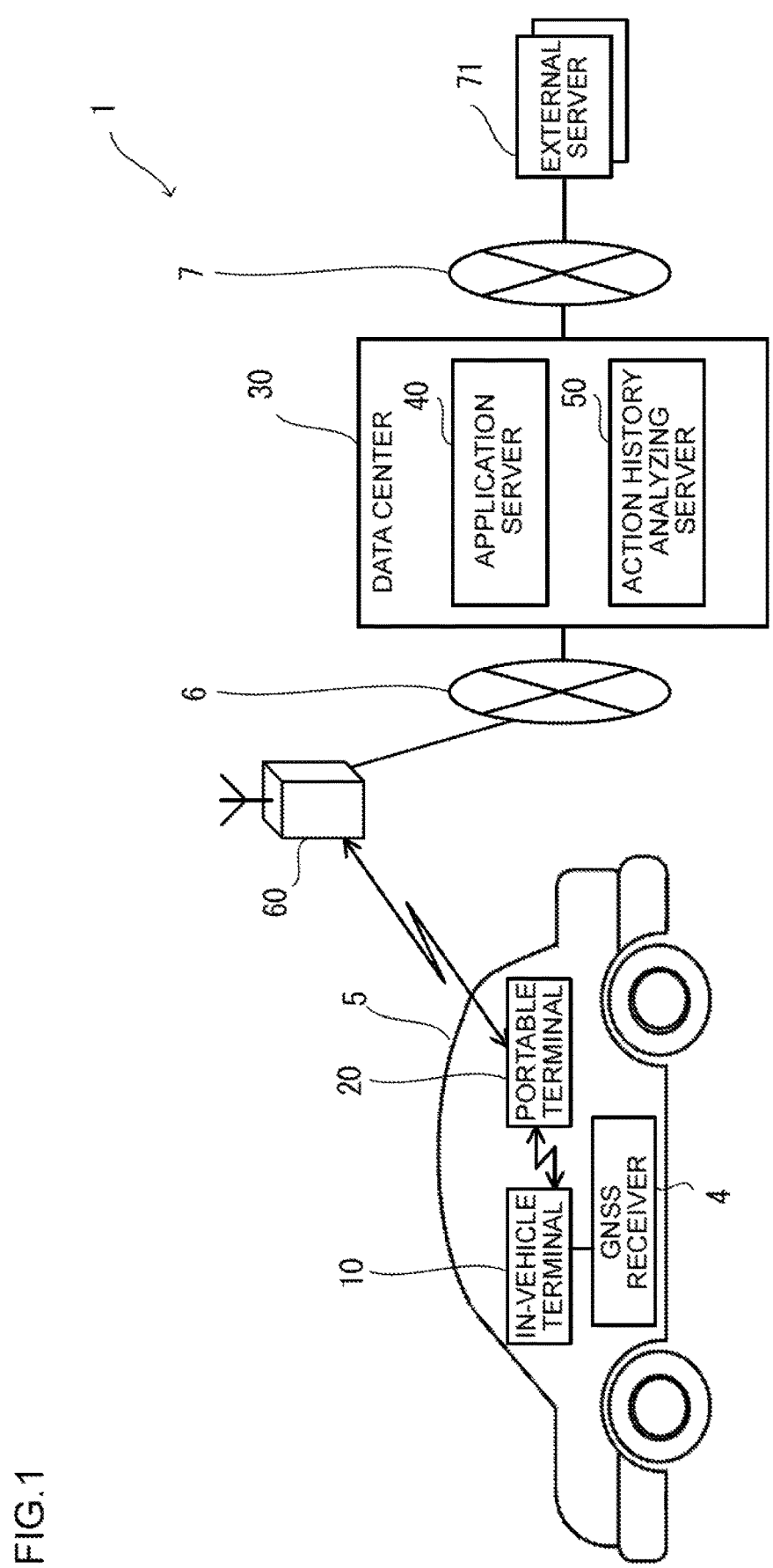
FIG. 1 is a block diagram showing a configuration of a content delivery system 1.

The first embodiment of a content delivery system according to the present invention is now explained with reference to FIG. 1 to FIG. 14.
(Configuration)
FIG. 1 is a block diagram showing a configuration of a content delivery system 1. The content delivery system 1 includes an in-vehicle terminal 10, a portable terminal 20, a data center 30, and a plurality of external servers 71.

In this embodiment, the term "content" refers to a program which outputs at least one piece of information among text, sound, and image, and is executed by the portable terminal 20. The content may be, for example, weather forecast content, SNS content, music playback content, photo display content, video display content, and news content.

The in-vehicle terminal 10 and the portable terminal 20 are mounted on a mobile vehicle 5. The vehicle 5 includes a GNSS (Global Navigation Satellite System) receiver 4 capable of calculating the position of the vehicle 5 based on the waves received from a plurality of satellites, and the position calculated by the GNSS receiver 4 is output to the in-vehicle terminal 10. The in-vehicle terminal 10 and the portable terminal 20 perform close-range wireless communication; for instance, wireless communication according to the communication standard of IEEE802.15.1 or communication via a wireless LAN. In this embodiment, let it be assumed that communication between the in-vehicle terminal 10 and the portable terminal 20 is constantly performed. The portable terminal 20 performs broad range wireless communication; for instance, performs communication with the nearest base station 60 based on the LTE (Long Term Evolution) system. In broad range wireless communication, the communication rate changes depending on the position of the vehicle 5. For example, the communication rate decreases when the vehicle 5 is in a tunnel or any other location where it is difficult for radio waves to penetrate, or in a downtown area where terminals using the base station are crowdedly dense. The configuration of the in-vehicle terminal 10 and the portable terminal 20 will be described later.

The base station 60 communicates with the portable terminal 20 by using radio waves, and communicates with the data center 30 via a network 6. In other words, the base station 60 mediates the communication between the portable terminal 20 and the data center 30. The network 6 is a carrier network (NW) line provided by a mobile phone communication carrier, or an ISP network provided by an Internet service provider (ISP). While only one base station 60 is illustrated in FIG. 1, the base station 60 is scattered across a wide area so that communication is possible even when the vehicle 5 mounted with the portable terminal 20 moves about.

The data center 30 includes an application server (hereinafter referred to as the "AP server") 40, and an action history analyzing server 50.

The AP server 40 sends contents according to requests from the in-vehicle terminal 10, and pushes contents to the in-vehicle terminal 10. The action history analyzing server 50 analyzes an action history 16b described later received from the portable terminal 20, and creates a content acquisition table 55 described later.

The external server 71 includes a storage unit for recording a plurality of contents. Each content is set with a deadline that the content can be stored in each cache of the in-vehicle terminal 10, the portable terminal 20, and the AP server 40 based on push delivery (hereinafter referred to as the "cache validity"). The cache validity is sent to the AP server 40 together with the content according to the content request from the AP server 40. Because the substance of the content changes together with time, such as a weather forecast, the cache validity is set when the content is to be mandatorily reacquired from the external server 71.

The AP server 40 performs push delivery by giving consideration to the cache validity as described later. The cache validity is set by the content holder to provide the content. The external server 71 sends the stored content according to a request from the AP server 40. The cache validity of a content is sent, together with the content, to the AP server 40 that sent the request.

Figure 2:
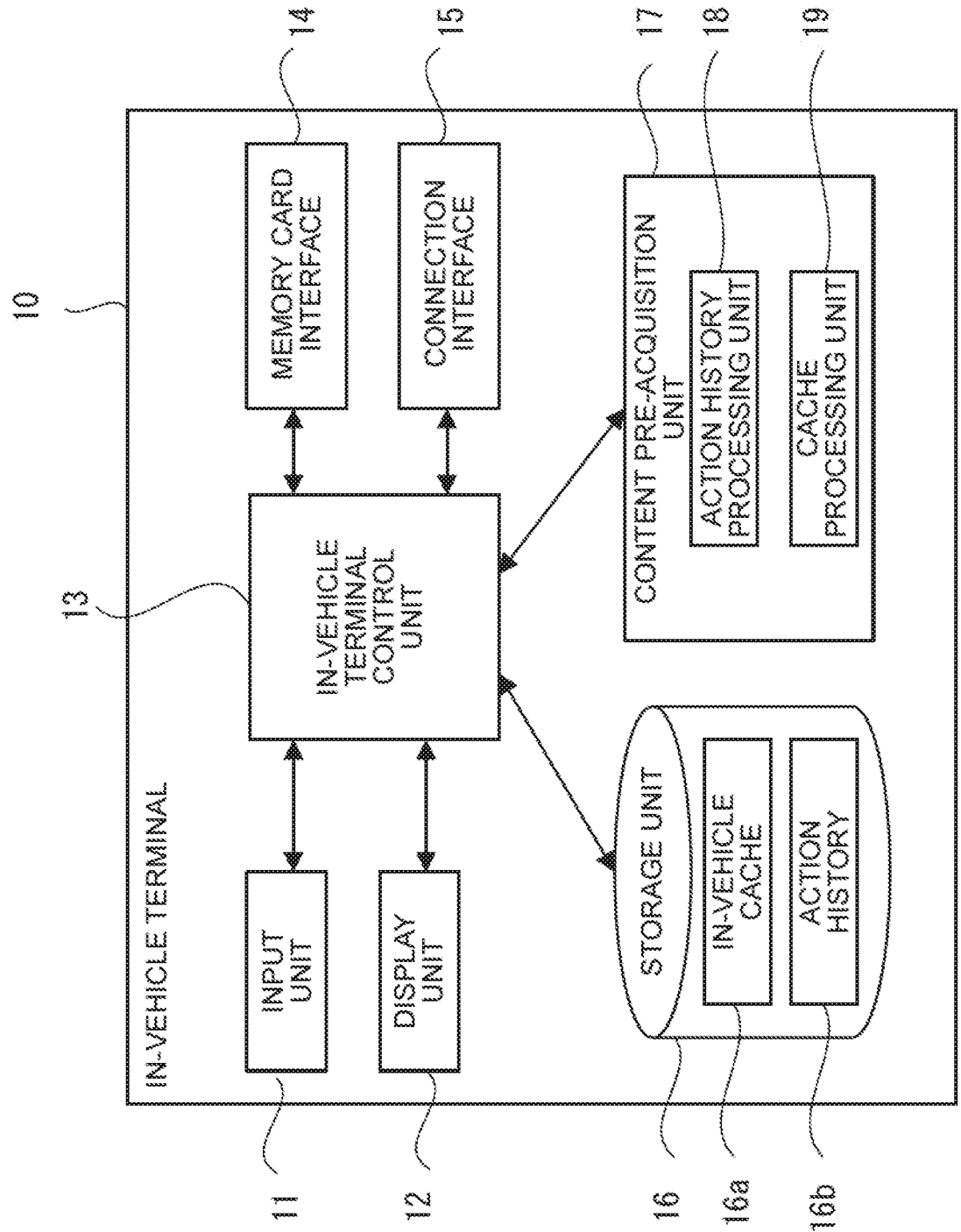
FIG. 2 is a diagram showing a system configuration of an in-vehicle terminal.

While only one vehicle 5 is illustrated in FIG. 1, there are a plurality of vehicles 5 and a plurality of in-vehicle terminals 10 and portable terminals 20 mounted in the vehicles 5.
(Configuration of In-Vehicle Terminal)
FIG. 2 is a diagram showing a system configuration of the in-vehicle terminal 10. The in-vehicle terminal 10 includes an input unit 11 to be used by a user for inputting information, a display unit 12 which displays information to a user, an in-vehicle terminal control unit 13 which controls operations of the in-vehicle terminal 10, a memory card interface 14 which identifies a memory card as an external storage device, a connection interface 15 which communicates with the portable terminal 20, a storage unit 16, and a content pre-acquisition unit 17 which performs coordinated operations with the AP server 40 and the portable terminal 20.

The connection interface 15 is a communication interface compatible with close-range wireless communication; for instance, IEEE802.15.1 or wireless LAN. The in-vehicle terminal 10 communicates with the portable terminal 20 by using the connection interface 15. In this embodiment, let it be assumed that a communication failure will not occur between the in-vehicle terminal 10 and the portable terminal 20.

The storage unit 16 is, for example, a flash memory. The storage unit 16 includes an in-vehicle cache 16a as a storage area for storing one or more contents that were pushed. The storage unit 16 stores an action history 16b output by an action history processing unit 18.

When an ignition key (not shown) is turned ON by a user, a list of contents is displayed on the display unit 12. When a user selects one of the contents by using the input unit 11, the selected content is executed by the in-vehicle terminal control unit 13. The in-vehicle terminal control unit 13 uses the content selected by the user when the content selected by the user exists in the in-vehicle cache 16a, and, if the content selected by the user does not exist in the in-vehicle cache 16a, acquires the content selected by the user from the portable terminal 20, or from the AP server 40 or the external server 71 via the portable terminal 20.

The in-vehicle terminal control unit 13 includes a CPU, a ROM, and a RAM. The ROM stores the programs described later, and the CPU reads the programs into the RAM and executes the programs.

The content pre-acquisition unit 17 includes an action history processing unit 18 which acquires the action history 16b when a content is acquired, and a cache processing unit 19 which processes the in-vehicle cache 16a. These operations will be described later. The action history processing unit 18 and the cache processing unit 19 configuring the content pre-acquisition unit 17 and the content pre-acquisition unit 17 represent, as functional blocks, the functions to be executed by the CPU of the in-vehicle terminal control unit 13.

The action history 16b stores the position of the vehicle 5 when the content was acquired from the external server 71, and the strength of the radio waves received by the portable terminal 20 via broadband wireless communication.

Figure 3:
FIG. 3 is a diagram showing an example of an action history 16b.

FIG. 3 is a diagram showing an example of the action history 16b. In the example shown in FIG. 3, the action history 16b is configured from information of the respective items including time, name, location of execution, radio wave strength, download speed, and download time.

Time is the time that the user selected a content by using the input unit 11. Name is the name of the content selected by the user by using the input unit 11. Location of execution is the latitude and longitude for identifying the position of the vehicle when the user selected the content by using the input unit 11. The output of the GNSS receiver 4 is used as this position. Radio wave strength is the average value of the received radio wave strength of the portable terminal 20 when the content was acquired. The radio wave strength is acquired from the portable terminal 20 immediately after the download of the content. Download speed is the average transmission rate of data when the content was acquired. Download time is the time required for acquiring the content.

The radio wave strength represents the communication status of the portable terminal 20 and the base station 60. To put it differently, the radio wave strength is not affected by the communication route from the base station 60 to the external server 71. Meanwhile, the download speed is affected by the entire communication route from the portable terminal 20 to the external server 71.

Two types of histories are indicated in the example of FIG. 3, and the upper history has a high radio wave strength of "−55 dBm", and the lower history has a low radio wave strength of "−90 dBm". Thus, the lower history shows that the communication status of the wireless communication between the portable terminal 20 and the base station 60 is inferior, and the download speed is slow.

(Configuration of Portable Terminal)

Figure 4:
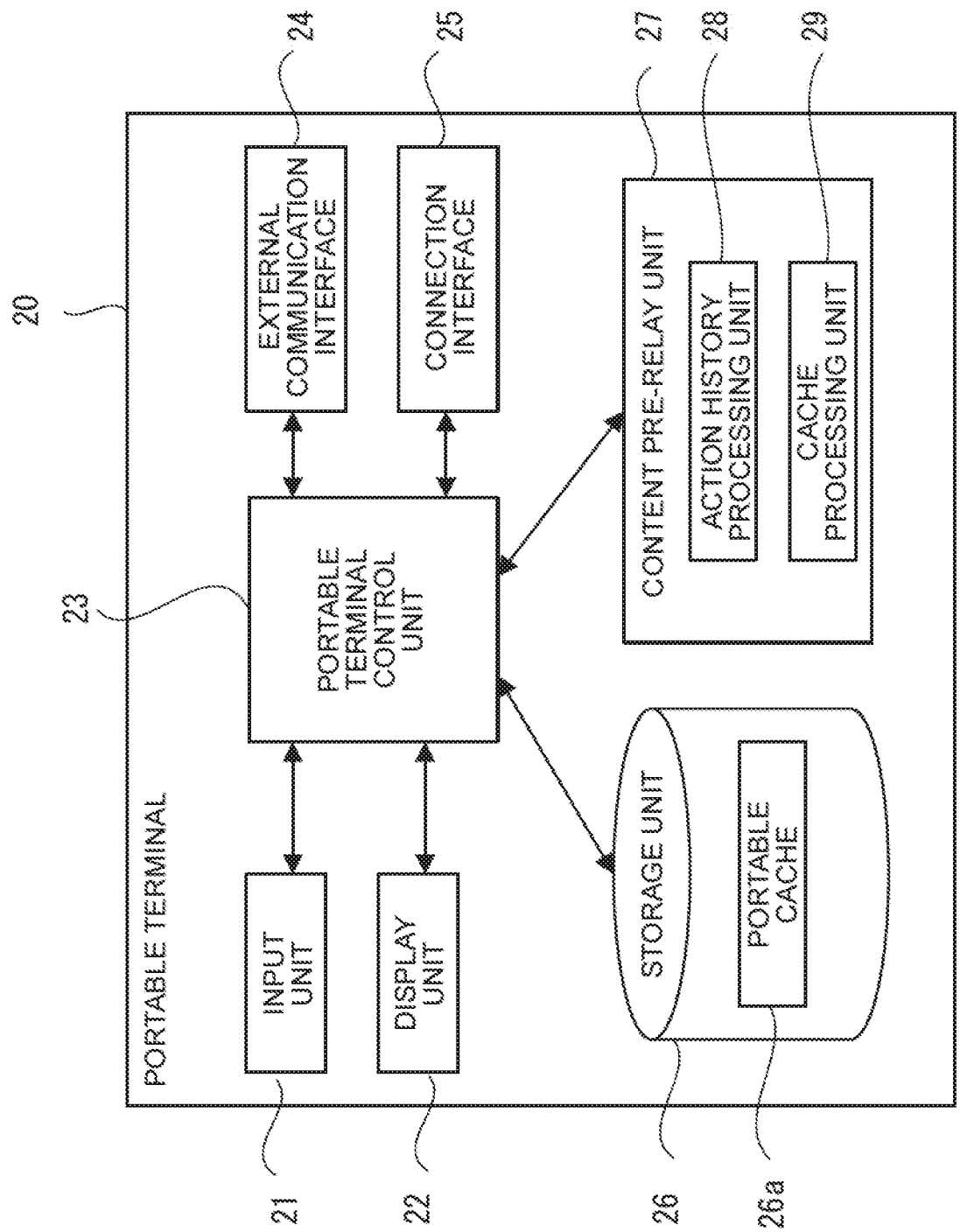
FIG. 4 is a diagram showing a system configuration of a portable terminal.

FIG. 4 is a diagram showing a system configuration of the portable terminal 20. The portable terminal 20 includes an input unit 21 to be used by a user for inputting information, a display unit 22 which displays information to a user, a portable terminal control unit 23 which controls operations of the portable terminal 20, an external communication interface 24, a connection interface 25 which connects with the in-vehicle terminal 10, a storage unit 26, and a content pre-relay unit 27 which performs coordinated operations with the AP server 40 and the in-vehicle terminal 10. The content pre-relay unit 27 includes an action history processing unit 28, and a cache processing unit 29 which processes the portable cache 26a.

The storage unit 26 is, for example, a flash memory. The storage unit 26 includes a portable cache 26a as a storage area for storing one or more contents that were pushed. The storage unit 26 stores logs and the like output by the portable terminal 20.

The portable terminal control unit 23 includes a CPU, a ROM, and a RAM. The CPU reads the programs stored in the ROM into the RAM, and executes the programs. The external communication interface 24 is a wireless communication interface compatible with broadband wireless communication; for instance, compatible with the LTE (Long Term Evolution) system. The portable terminal 20 communicates with the data center 30 through the network 6 by communicating with the nearest base station 60 by using the external communication interface 24. The external communication interface 24 detects the radio wave strength, which is the strength of the radio waves received from the base station 60, and outputs the detected radio wave strength to the portable terminal control unit 23.

The connection interface 25 is a communication interface compatible with close-range wireless communication; for instance, compatible with IEEE802.15.1 or wireless LAN. The portable terminal 20 communicates with the in-vehicle terminal 10 by using the connection interface 15.

The action history processing unit 28 sends, to the in-vehicle terminal 10, the average value of the radio wave strength upon acquiring, or downloading, a content from the external server 71. The action history processing unit 18 of the in-vehicle terminal stores the received radio wave strength as one item of the action history 16.

The content pre-relay unit 27, the action history processing unit 28 configuring the content pre-relay unit 27, and the cache processing unit 29 represent, as functional blocks, the functions to be executed by the CPU of the portable terminal control unit 23.

(Configuration of Application Server)

Figure 5:
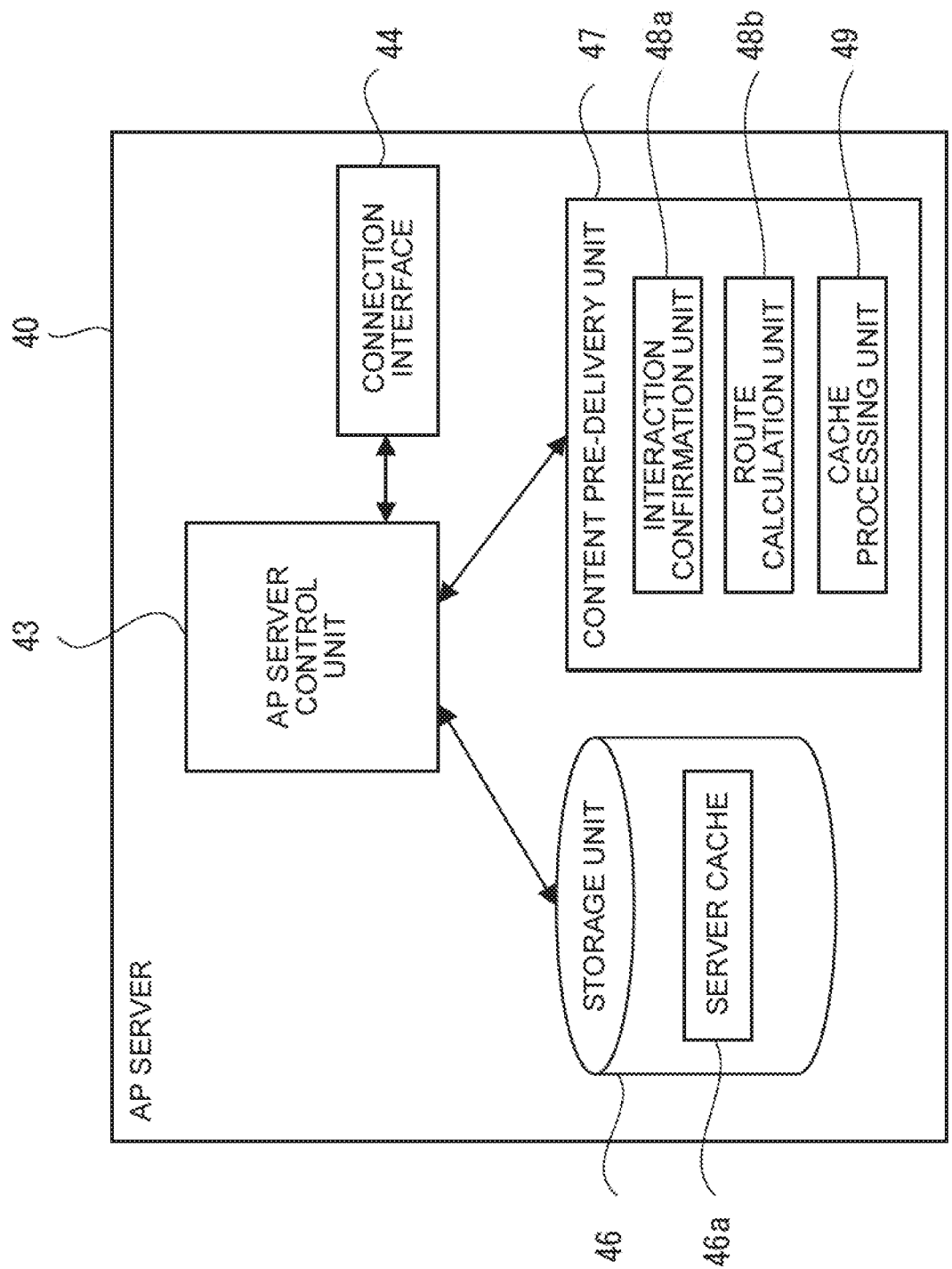
FIG. 5 is a diagram showing a system configuration of an AP server.

FIG. 5 is a diagram showing a system configuration of the AP server 40. The AP server 40 is a server device. The AP server 40 includes a content pre-delivery unit 47 which performs push delivery, an AP server control unit 43 which controls operations of the AP server, and a communication interface 44 which connects with the action history analyzing server 50 and the network 7.

The storage unit 46 is, for example, a hard disk drive. The storage unit 46 includes a server cache 46a as a storage area which stores one or more contents acquired from the external server 71.

The content pre-delivery unit 47 includes a cache processing unit 49 which processes the server cache 46a, an interaction communication unit 48a which confirms the interaction with an external service and whether or not an external service is alive, and a route calculation unit 48b which calculates the route from a place of departure to a destination of the vehicle 5.

(Configuration of Action History Analyzing Server)

Figure 6:
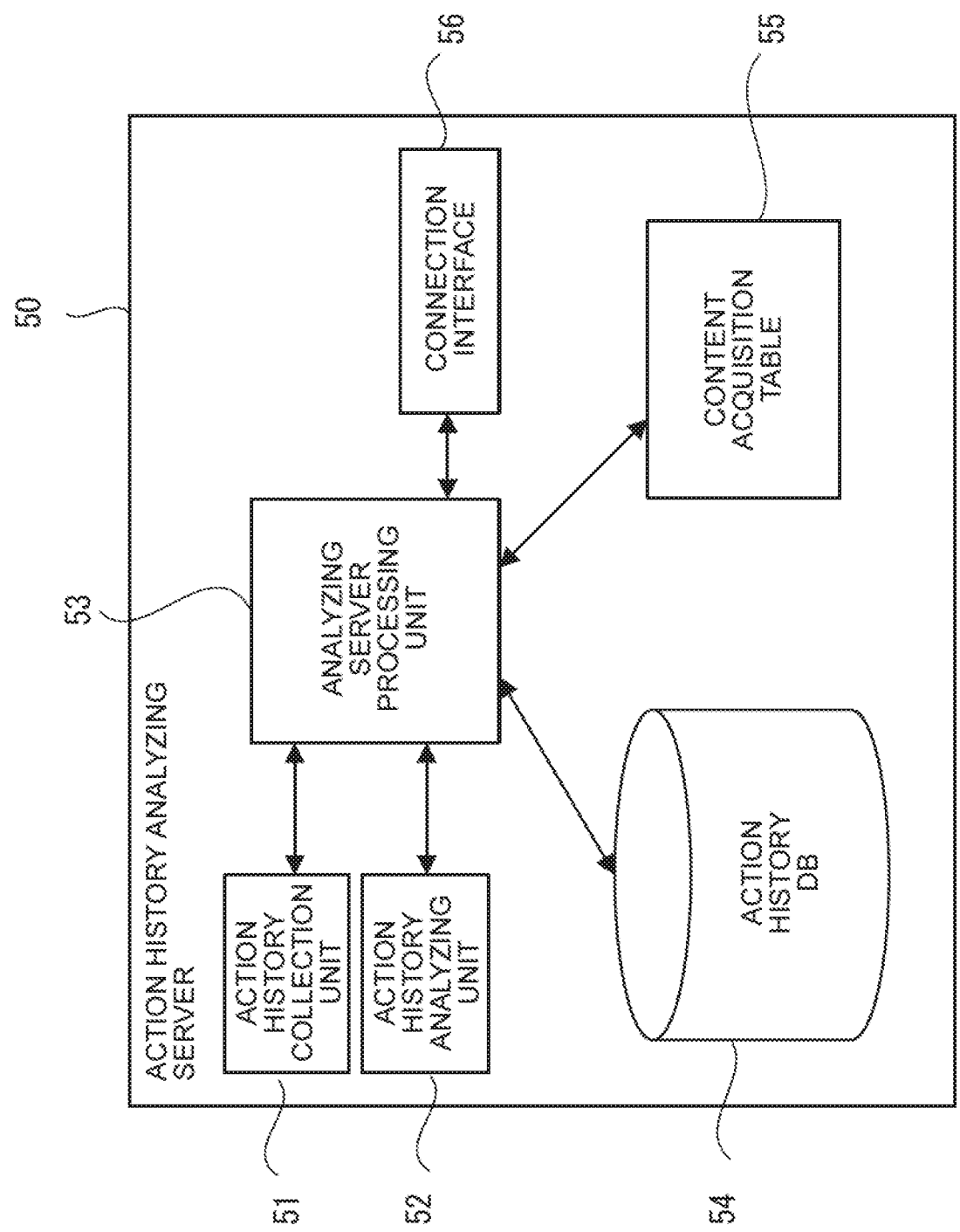
FIG. 6 is a diagram showing a system configuration of an action history analyzing server.

FIG. 6 is a diagram showing a system configuration of the action history analyzing server 50. The action history analyzing server 50 is one server device. The action history analyzing server 50 includes an action history collection unit 51 which collects the action history output by the in-vehicle terminal 10, an analyzing server control unit 53, an action history DB 54 which stores the action history 16b collected from the in-vehicle terminal 10, an action history analyzing unit 52 which analyzes the action history stored in the action history DB 54, a connection interface 56 which connects with the network 6, and a content acquisition table 55 which is output by the action history analyzing unit 52.

The action history DB 54 is an accumulation of the action history 16b illustrated in the example of FIG. 3. Accordingly, the types of information stored in the action history DB 54 are the same as the action history 16b. However, as described above, because the content delivery system 1 is configured from a plurality of in-vehicle terminals 10 and portable terminals 20, the action history DB 54 stores the action history 16b sent from a plurality of in-vehicle terminals 10.

The action history analyzing unit 52 reads the action history DB 54, and creates the content acquisition table 55 based on the processing described later. The content acquisition table 55 is obtained by classifying the position executed for each content, and evaluating the communication status and the executed frequency by using an evaluation score. The content acquisition table 55 is referenced when the AP server 40 performs push delivery.

Figure 7:
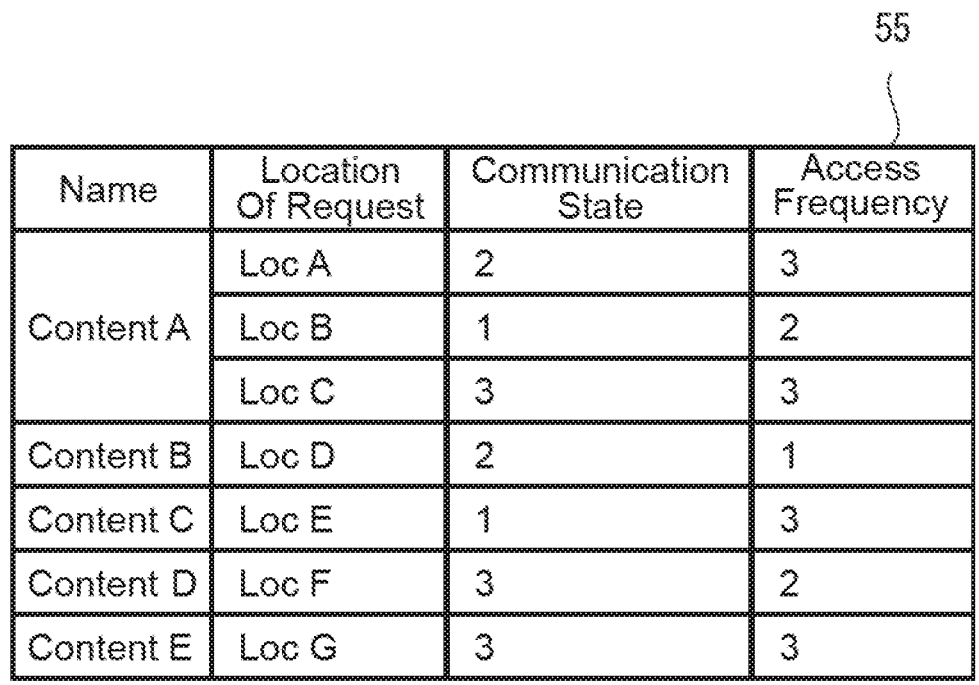
FIG. 7 is a diagram showing an example of a content acquisition table.

FIG. 7 is a diagram showing an example of the content acquisition table 55. In the example of FIG. 7, the content acquisition table 55 is configured from the respective items including name, location of request, communication status, and access frequency. Name is the name of the content, and is the same as the "name" of the action history 16*b* shown in FIG. 3. Location of request is the position of the vehicle 5 when the user selected the content by using the input unit 11; that is, indicates in which area the "position" of the action history 16*b* is included.

Communication status represents the communication status of the wireless communication of the portable terminal 20 and the base station 60 when the content was acquired, and an evaluation score of 1 point to 3 points is granted based on the "radio wave strength" and the "download speed" of the action history 16*b*. The communication status is determined to be favorable as the "radio wave strength" is strong and the "download speed" is fast, and the communication status is determined to be inferior as the "radio wave strength" is weak and the "download speed" is slow. A higher evaluation score is granted when the communication status is determined to be favorable, and a lower evaluation score is granted when the communication status is determined to be inferior. The evaluation scores are determined based on the "radio wave strength", the "download speed", and a predetermined threshold set by the administrator of the data center 30.

For example, the "radio wave strength" is evaluated by using radio wave strength thresholds A and B that satisfy the relation of A<B. If the "radio wave strength" is less than A, the evaluation score of the communication status will be 1 point, if the "radio wave strength" is B or higher, the evaluation score of the communication status will be 3 points, and if the "radio wave strength" is A or higher and less than B, the evaluation score of the communication status will be 2 points. Furthermore, when the evaluation score as the evaluation of the "radio wave strength" is 2 points or more, the evaluation is revised by additionally giving consideration to the "download speed". In other words, if the "download speed" is less than download speed threshold C, the evaluation score of the communication status will be decremented by 1.

The access frequency is determined by the number of times that the content was activated. For example, the access frequency is determined based on the number of times that the content was activated in a predetermined period, and based on predetermined thresholds D and E as integers. A lower evaluation scores is set as the number of times that the content was activated is great. When the number of times that a certain content was activated in a predetermined period of time is less than "D times", the evaluation score of the access frequency is set to 3 points. Similarly, when the number of times that a certain content was activated in a predetermined period of time is "E times" or more, the evaluation score of the access frequency is set to 1 point, and when number of times that a certain content was activated in a predetermined period of time is "D times" or more and less than "E times", the evaluation score of the access frequency is set to 2 points. Similar to the threshold of the communication status, the threshold that determines the evaluation score of the access frequency can be set arbitrarily by the administrator of the data center 30.

(Three Operations of System)

The three key operations of the content delivery system 1 are now explained. The three key operations are, specifically, acquisition of contents, creation of the content acquisition table 55, and push delivery of contents.

(Acquisition of Content)

The in-vehicle terminal 10 acquires and executes the content selected by a user. While the contents are stored in the external server 71, the pushed contents are stored in the in-vehicle terminal 10, the portable terminal 20, and the AP server 40. When the content selected by the user is not stored in the in-vehicle cache 16*a*, the portable cache 26*a*, and the server cache 46*a*, the in-vehicle terminal 10 acquires the content from the external server 71. When the content selected by the user is stored in one of the caches, the content is read from that cache.

Upon acquiring the content from the external server 71 as described above, the action history processing unit 18 of the in-vehicle terminal 10 acquires the action history, and stores the acquired action history as the action history 16*b* in the storage unit 16.

(Creation of Content Acquisition Table)

Figure 8:
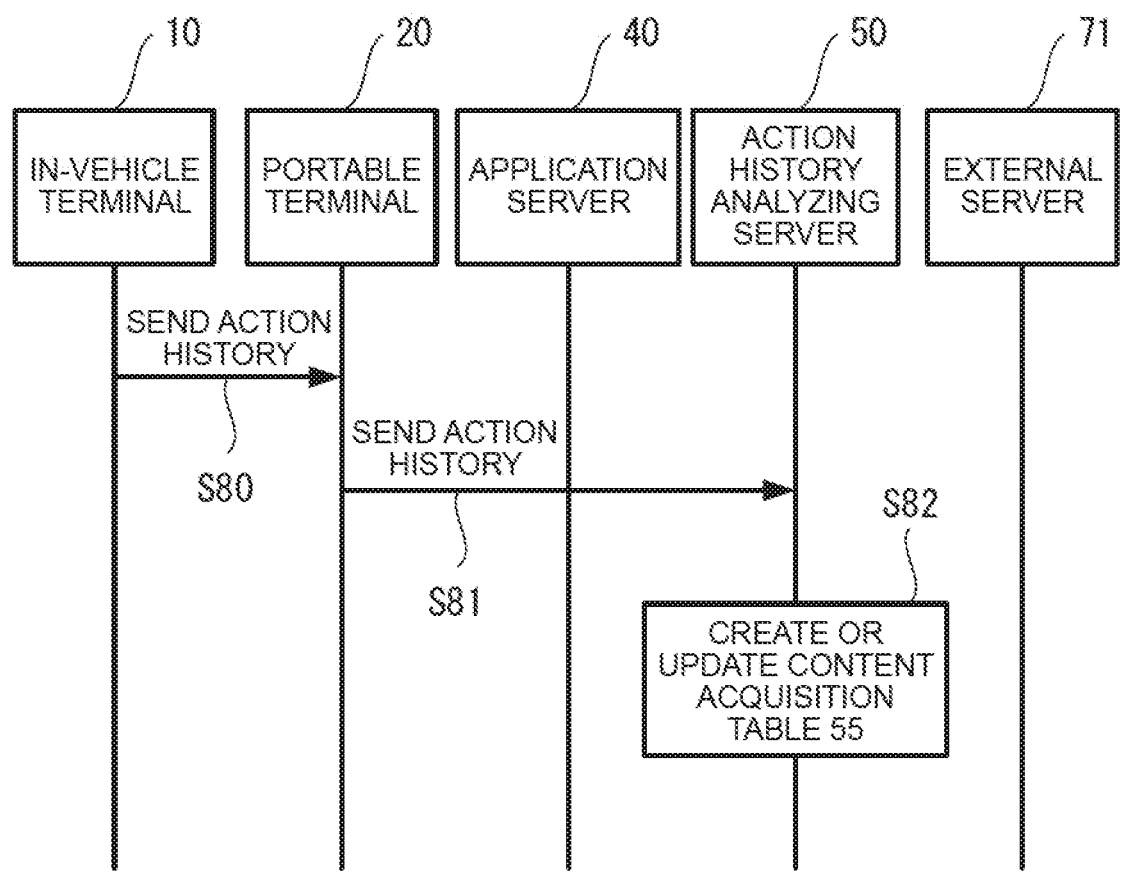
FIG. 8 is a transition diagram showing a process in which the content acquisition table is created.

FIG. 8 is a transition diagram showing the process of creating the content acquisition table 55. The explanation is now provided in correspondence with the step numbers in the diagram.

For each predetermined interval, the in-vehicle terminal 10 sends the action history 16*b* to the portable terminal 20 in order to send the action history 16*b* stored in the storage unit 16 to the action history analyzing server 50 (step S80). However, the action history 16*b* may also be sent at the user's arbitrary timing.

The action history 16*b* sent to the portable terminal 20 is transferred from the portable terminal 20 to the action history analyzing server 50 (step S81). In other words, as a result of the processing of steps S80 and S81 being respectively performed in the in-vehicle terminal 10 and the portable terminal 20, the action history 16*b* is sent from the in-vehicle terminal 10 to the action history analyzing server 50 via the portable terminal 20.

The action history 16*b* sent to the action history analyzing server 50 is integrated with the previously accumulated information and stored in the action history DB 54. The action history DB 54 is analyzed by the action history analyzing unit 52, and the content acquisition table 55 is thereby created or updated (step S82). The action history analyzing unit 52 may analyze the action history DB 54 immediately after receiving the action history from the portable terminal 20, or in fixed intervals.

(Push Delivery)

Figure 9:
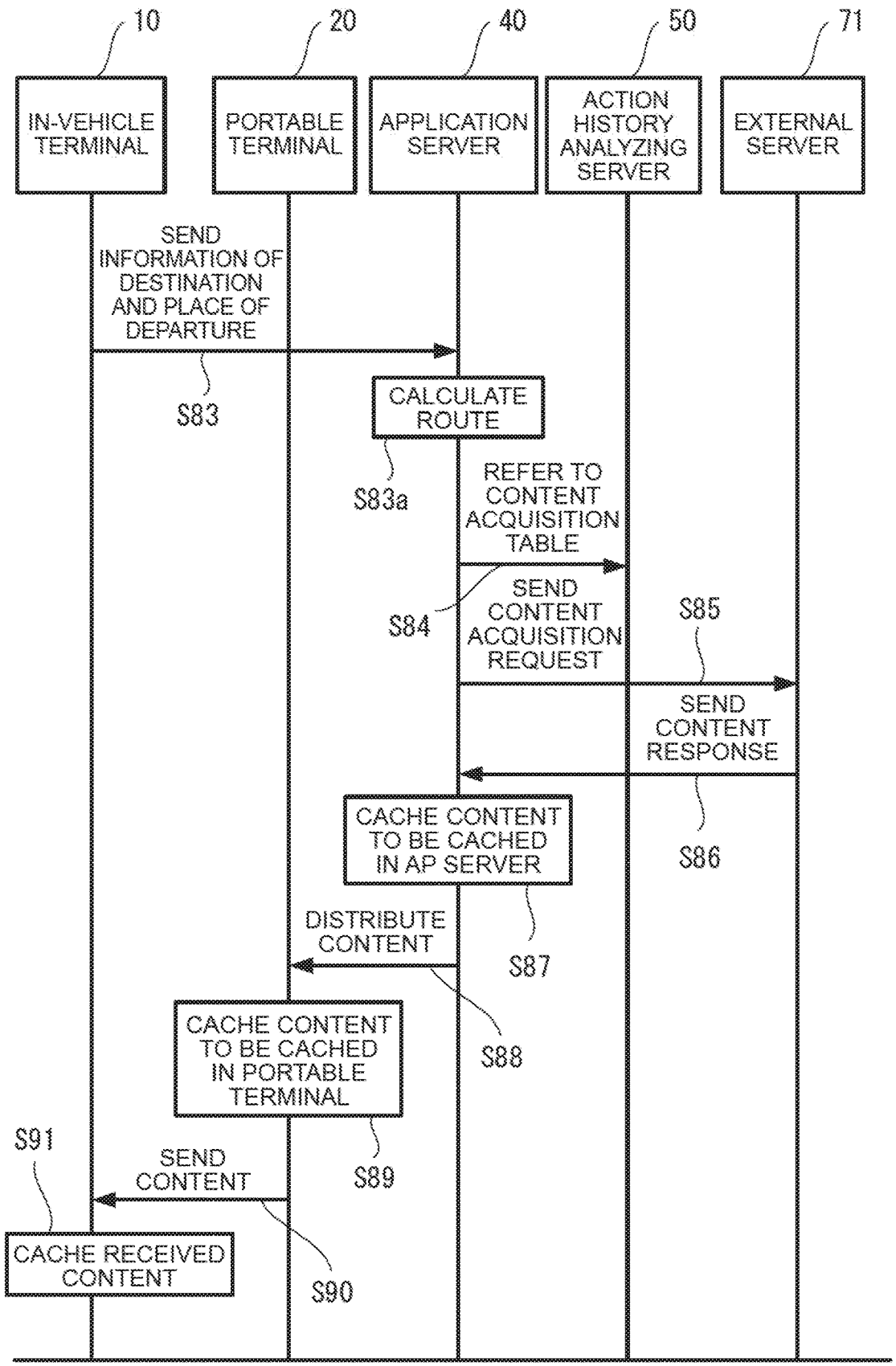
FIG. 9 is a transition diagram showing a process in which a content is pushed by the AP server.

FIG. 9 is a transition diagram showing the process in which a content is pushed by the AP server 40. The explanation is now provided in correspondence with the step numbers in the diagram.

When information regarding the destination and place of departure is input to the in-vehicle terminal 10 by the user via the input unit 11, the input information is sent to the AP server 40 via the portable terminal 20 (step S83). However, as the place of departure, the position acquired from the GNSS receiver 4 of the vehicle 5 may also be used.

When the destination and place of departure are sent from the portable terminal 20 to the AP server 40, the route calculation unit 48*b* of the AP server 40 calculates the route from the place of departure to the destination (step S83*a*).

The AP server 40 refers to the content acquisition table 55 of the action history analyzing server 50, and identifies any dead spot along the calculated route. Subsequently, the content to be stored in the AP server 40, the portable terminal 20 or the in-vehicle terminal 10 is determined (step S84). If there is any content to be stored, the AP server 40 sends a content acquisition request to the external server 71 (step S85).

The external server 71 that received the content acquisition request sends a content response, which indicates the sending of the requested content, to the AP server 40 (step S86).

The AP server 40 that received the content response from the external server 71 stores in the server cache 46a, among the received contents, the content to be stored in the AP server 40 (step S87). The AP server 40 sends, to the portable terminal 20, the content to be stored in the in-vehicle terminal 10 or the portable terminal 20 (step S88). The information to be sent in the foregoing case contains information of the content storage destination, and the cache validity.

The cache processing unit 29 of the portable terminal 20 refers to information of the storage destination added to the content, and stores in the portable cache 26a, among the received contents, the content to be stored in the portable terminal 20 (step S89). The content pre-relay unit 27 refers to information of the cache destination added to the content, and sends the content to be stored in the in-vehicle terminal 10 to the in-vehicle terminal 10 (step S90).

When the in-vehicle terminal 10 receives the content sent from the portable terminal 20, the cache processing unit 19 stores the received content in the in-vehicle cache 16a (step S91).

The flowchart of the program for executing the operation explained above is now explained.

(Flowchart of Push Delivery of AP Server)

Figure 10:
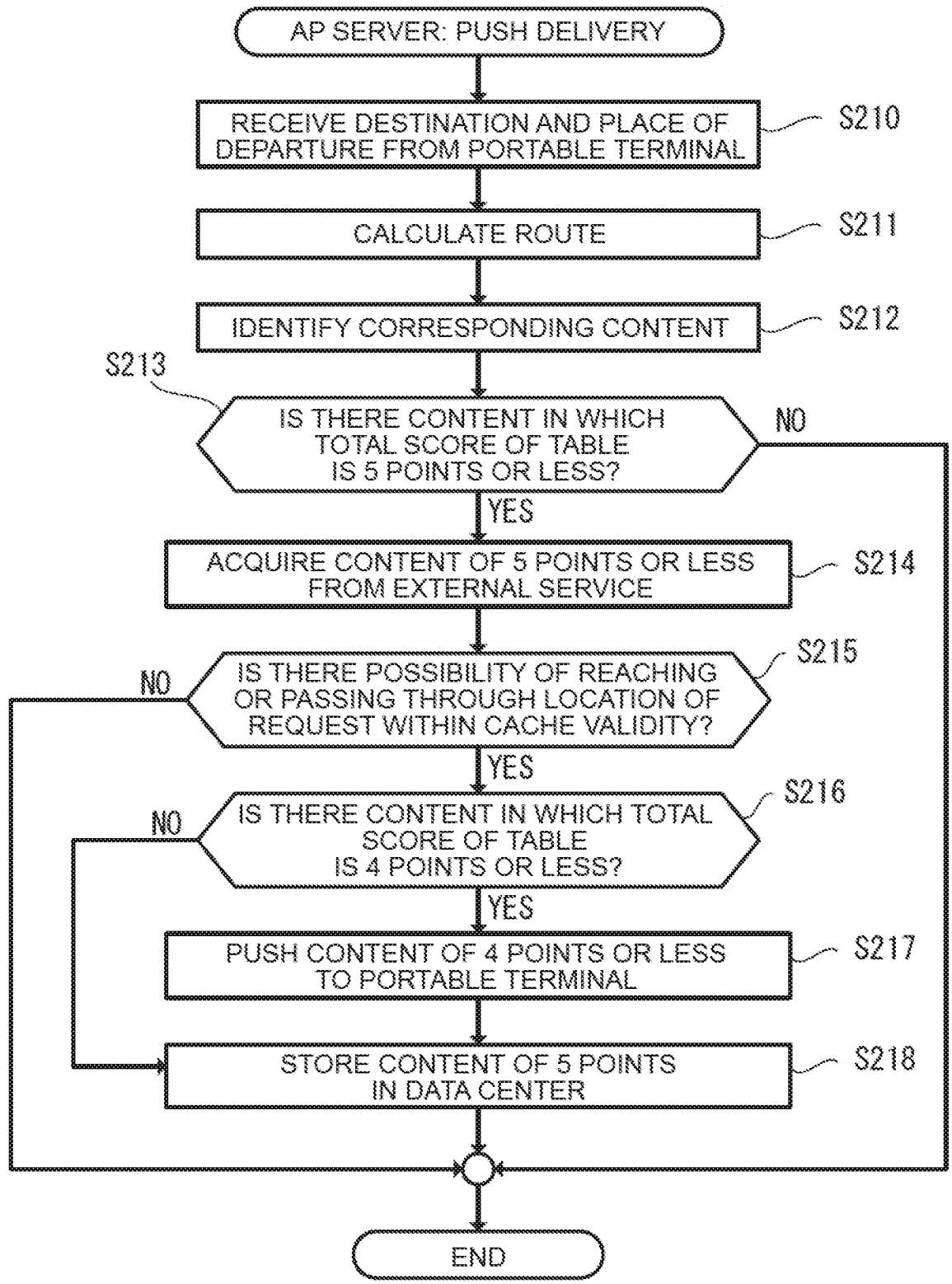
FIG. 10 is a flowchart explaining an operation in which a content is pushed by the AP server.

FIG. 10 is a flowchart explaining an operation in which a content is pushed by the AP server 40. The executing agent of the respective steps explained below is the content pre-delivery unit 47 of the AP server 40.

In step S210, the destination and place of departure are received from the portable terminal 20, and the routine proceeds to step S211. In step S211, the route calculation unit 48b is used to calculate the route from the place of departure to the destination received in step S210, and the routine proceeds to step S212. In step S212, the content acquisition table 55 of the action history analyzing server 50 is referenced, and the content in which the location of request is contained in the route calculated in step S211 is identified. A content that is likely to be used by the in-vehicle terminal 10 upon the vehicle 5 traveling from the place of departure to the destination is thereby identified. For example, in cases where "Loc A", "Lac B" and "Loc D" are included in the calculated route, contents A and B are identified. The routine then proceeds to step S213.

In step S213, among the contents identified in S212, whether there is a content in which the total evaluation score of "communication status" and "access frequency" in the content acquisition table 55 is 5 points or less is determined. Here, with regard to the total evaluation score of "communication status" and "access frequency", a content with a smaller value represents that such content was frequently acquired in the past in a dead spot where the communication status of wireless communication between the portable terminal 20 and the base station 60 is inferior. When it is consequently determined that there is a content of 5 points or less, the routine proceeds to step S214, and, when it is determined that all of the identified contents are 6 points, the flowchart shown in FIG. 10 is ended. However, when a certain content contains a plurality of locations of request, the content with the lowest total value of "communication status" and "access frequency" is referenced irrespective of the estimated travel route. Note that, because a content having an evaluation score of 6 points is not pushed, such content will be acquired from the external server 71 each time that it is used by the user.

Based on the processing of steps S212 and S213 explained above, the content pre-delivery unit 47 can identify in advance, based on the content acquisition table 55, a content that is likely to be used by the in-vehicle terminal 10 in a dead spot where the communication status of wireless communication between the portable terminal 20 and the base station 60 is inferior upon the vehicle 5 traveling from the place of departure to the destination. Here, as described above, the content acquisition table 55 is created based on the action history DB 54 which stores the action history 16b sent from a plurality of in-vehicle terminals 10. In other words, in the processing of steps S212 and S213, a content that is likely to be used in a dead spot is identified based on the past content usage history by a plurality of in-vehicle terminals 10.

In step S214, among the contents identified in step S211, the content in which the total evaluation score is 5 points or less, and the cache validity of the content, are acquired from the external server 71, and the routine proceeds to step S215.

In step S215, whether the in-vehicle terminal 10 will reach the location of request of the content acquisition table 55 within the cache validity is determined based on the route and current time calculated in step S211. When it is determined that the in-vehicle terminal 10 will reach the location of request of the content acquisition table 55 within the cache validity, the routine proceeds to step S216, and when it is determined that the in-vehicle terminal 10 will not reach the location of request of the content acquisition table 55 within the cache validity, the flowchart shown in FIG. 10 is ended.

In step S216, among the contents identified in S211, whether there is a content in which the total evaluation score of "communication status" and "access frequency" in the content acquisition table 55 is 4 points or less is determined. When it is determined that there is a content of 4 points or less, the routine proceeds to step S217, and when it is determined that there is no content of 4 points or less, the routine proceeds to step S218. It is thereby possible to set, as the priority of the content, the total evaluation score representing the communication status of wireless communication between the portable terminal 20 and the base station 60, and the frequency that the content has been used. Based on the level of the foregoing priority, it is possible to determine whether the content should be stored in the server cache 46a, or stored in another cache.

In step S217, the content in which the total evaluation score of "communication status" and "access frequency" in the content acquisition table 55 is 4 points or less is pushed to the portable terminal 20 together with its evaluation score, and the routine proceeds to step S218. The content is thereby sent from the AP server 40 to the portable terminal 20, or to the in-vehicle terminal 10 via the portable terminal 20. In S218, the contents in which the total evaluation score of "communication status" and "access frequency" in the content acquisition table 55 is 5 points are stored in the server cache 46a of the AP server 40.

(Flowchart of Push Delivery of Portable Terminal)

Figure 11:
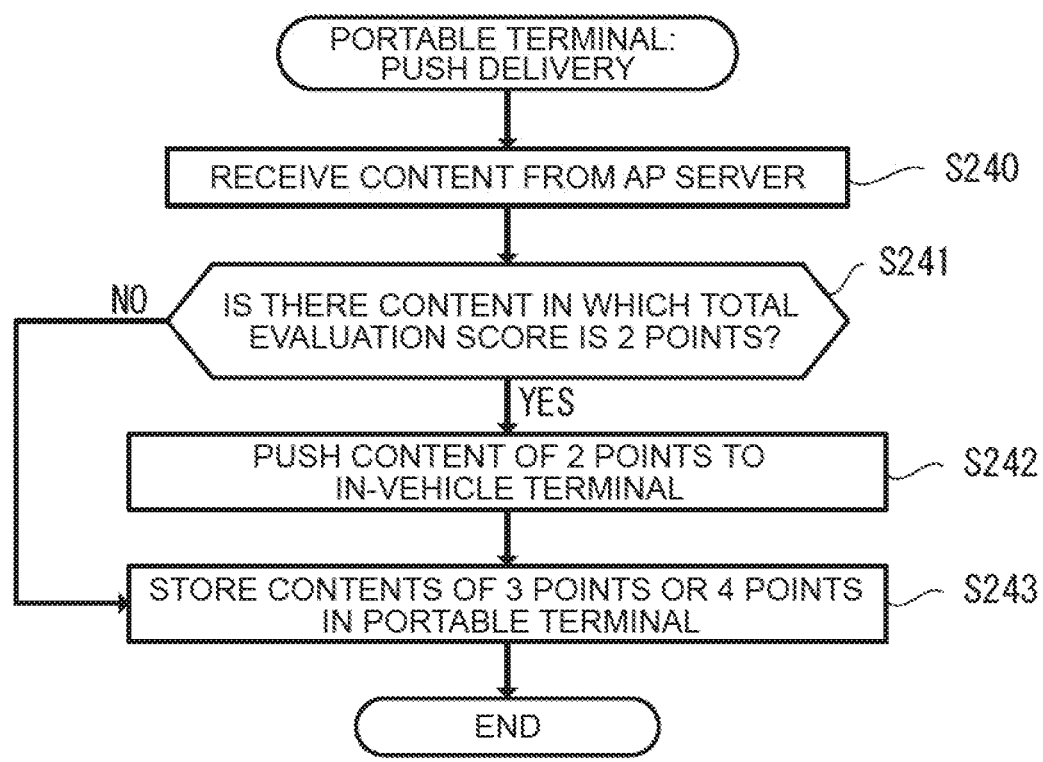
FIG. 11 is a flowchart explaining an operation in which a content is pushed by the portable terminal.

FIG. 11 is a flowchart explaining an operation in which a content is pushed by the portable terminal 20. The executing agent of the respective steps explained below is the content pre-relay unit 27 of the portable terminal 20.

In step S240, the contents and the evaluation scores of the respective contents are received from the AP server 40, and the routine proceeds to step S241. In step S241, whether there is a content in which the evaluation score is 2 points is determined. When it is determined that there is a content of 2 points, the routine proceeds to step S242, and when it is determined that there is no content of 2 points, the routine proceeds to step S243. It is thereby possible to set, as the priority of the content, the total evaluation score representing the communication status of wireless communication between the portable terminal 20 and the base station 60, and the frequency that the content has been used. Based on the level of the foregoing priority, it is possible to determine whether the content should be stored in the portable cache 26a, or in the in-vehicle cache 16a.

In step S242, a content having an evaluation score of 2 points is pushed to the in-vehicle terminal 10, and the routine proceeds to step S243. Note that the content pre-acquisition unit 17 of the in-vehicle terminal 10 that received the content stores the received content in the in-vehicle cache 16a.

In step S243, among the contents received from the AP server 40, contents having an evaluation score of 2 points or more; that is, contents having an evaluation score of 3 points or 4 points, are stored in the portable cache 26a, and the routine shown in FIG. 11 is ended.

(Flowchart of Content Request of In-Vehicle Terminal)

Figure 12:
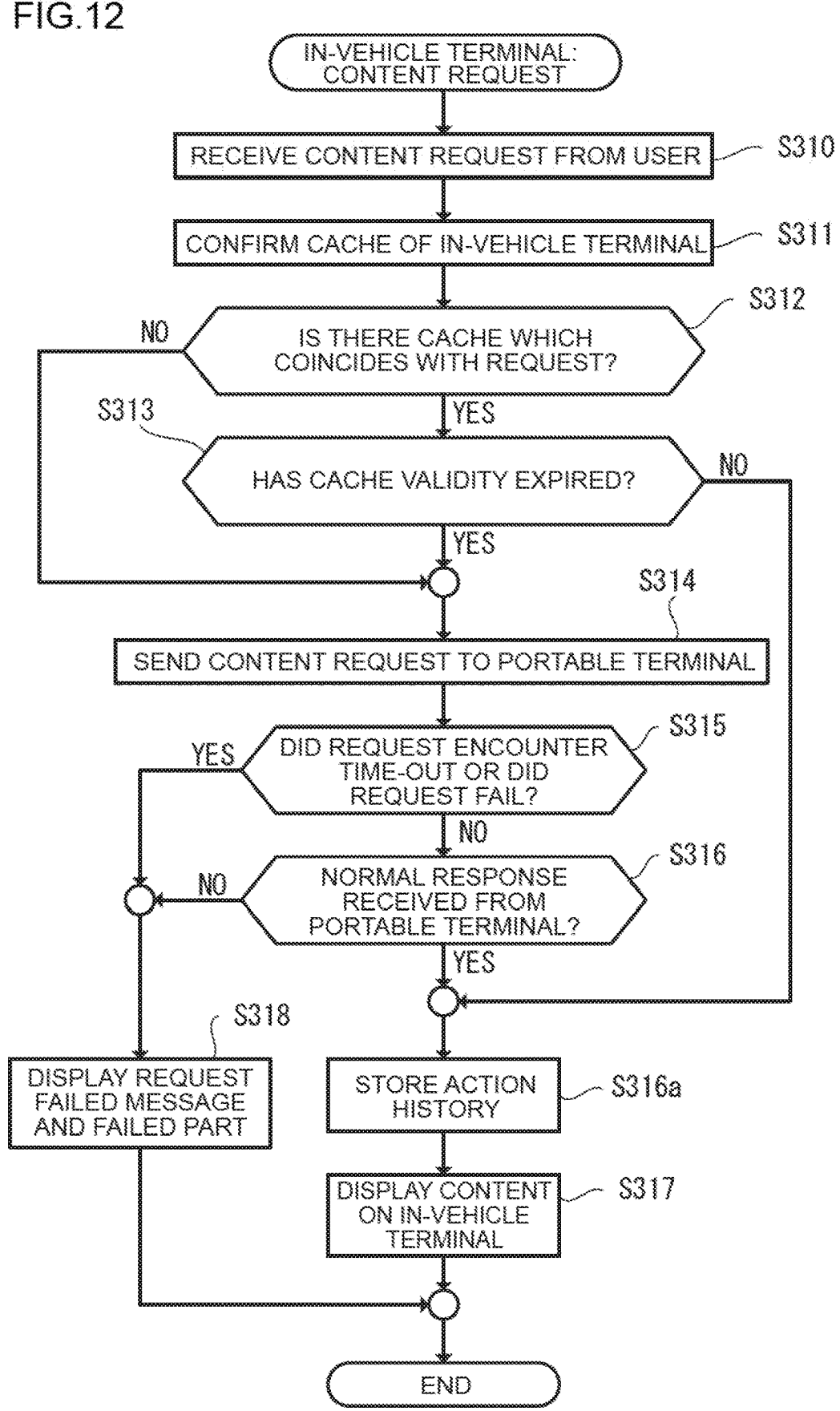
FIG. 12 is a flowchart showing content request processing performed by the in-vehicle terminal.

FIG. 12 is a flowchart showing the content request processing performed by the in-vehicle terminal 10. The executing agent of the respective steps explained below is the CPU of the in-vehicle terminal control unit 13.

In step S310, when a request for activating the content is received from a user via the input unit 11, the routine proceeds to step S311. In step S311, the requested content is searched from the cache 16a by using the cache processing unit 19, and the routine proceeds to step S312.

In step S312, whether the content requested in step S310 exists in the in-vehicle cache 16a is determined. When it is determined that the requested content exists in the in-vehicle cache 16a, the routine proceeds to step S313, and when it is determined that the requested content does not exist in the in-vehicle cache 16a, the routine proceeds to step S314. In step S313, whether the cache validity of the content has expired is determined. When it is determined that the cache validity has expired, the routine proceeds to step S314, and when it is determined that the cache validity has not expired, the routine proceeds to step S317.

In step S314, a content request is sent to the portable terminal 20, and the routine proceeds to step S315. In step S315, whether the request has reached a time-out or was unsuccessful is determined. When it is determined that the request has reached a time-out or was unsuccessful, the routine proceeds to step S318, and in other cases the routine proceeds to step S316. In step S316, whether a normal response was received from the portable terminal 20 is determined. When it is determined that a normal response was received, the routine proceeds to step S316a, and when it is determined that a normal response was not received, the routine proceeds to step S318.

In step S316a, the action history processing unit 18 records the history related to the content requested in step S314 as the action history 16b. In other words, based on the processing in step S316a, a record of the action history 16b illustrated in FIG. 3 is increased by one line. The routine thereafter proceeds to step S317.

In step S317, the acquired content is executed and displayed on the display unit 12, and the flowchart of FIG. 12 is ended. In step S318, a request failed message containing the request failed part is displayed on the display unit 12, and the flowchart of FIG. 12 is ended.

(Flowchart of Content Request of Portable Terminal)

Figure 13:
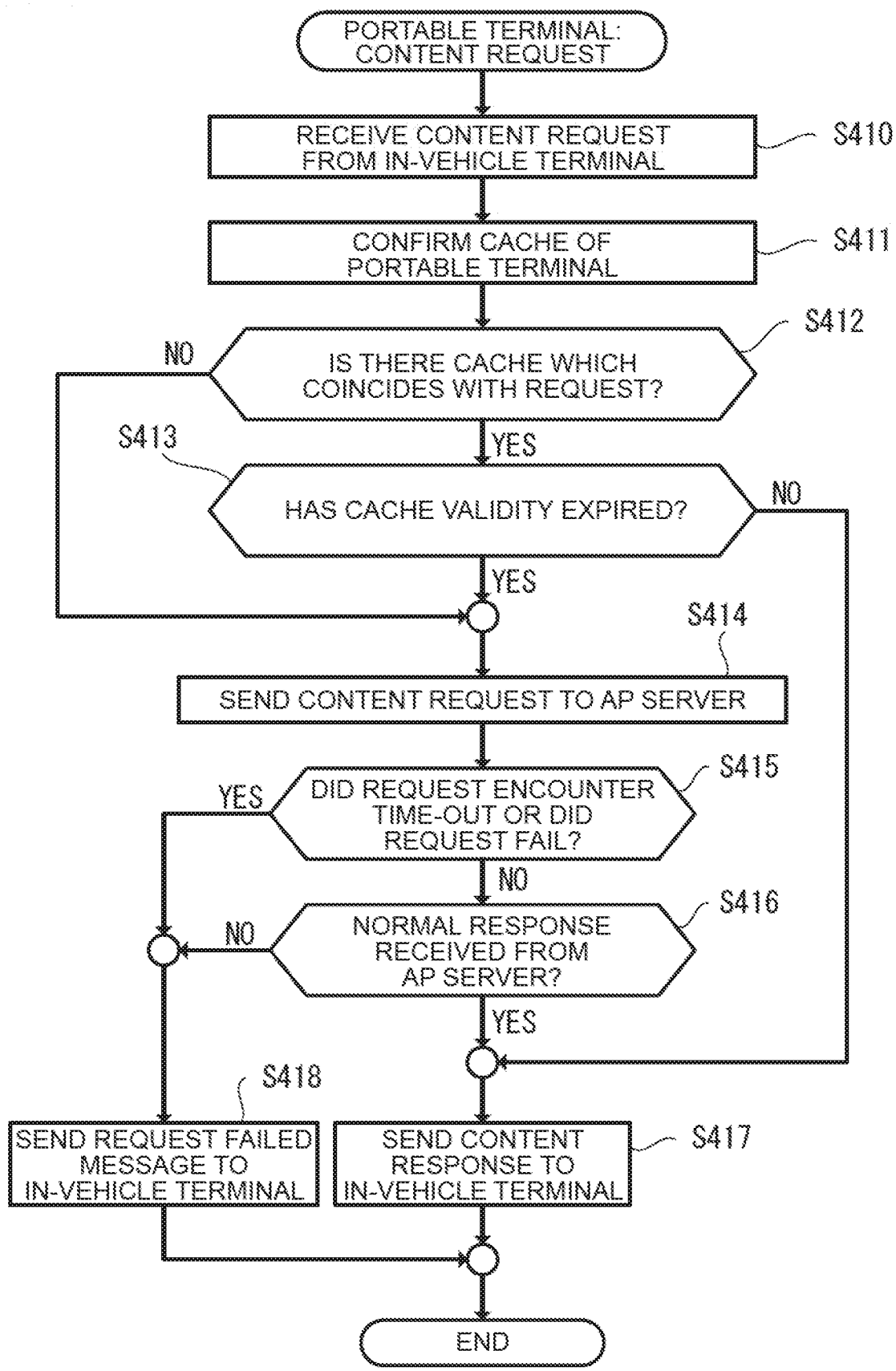
FIG. 13 is a flowchart showing a content request processing performed by the portable terminal.

FIG. 13 is a flowchart showing the content request processing performed by the portable terminal 20. The executing agent of the respective steps explained below is the CPU of the portable terminal control unit 23.

In step S410, a content request is received from the in-vehicle terminal 10, and the routine proceeds to step S411. In step S411, the content requested by using the cache processing unit 2 searched from the portable cache 26a, and the routine proceeds to step S412.

In step S412, whether the content requested in step S410 exists in the portable cache 26a is determined. When it is determined that the requested content exists in the portable cache 26a, the routine proceeds to step S413, and when it is determined that the requested content does not exist in the portable cache 26a, the routine proceeds to step S414. In step S413, whether the cache validity of the content has expired; that is, whether the cache validity has elapsed, is determined. When it is determined that the cache validity has expired, the routine proceeds to step S414, and when it is determined that the cache validity has not yet expired, the routine proceeds to step S417.

In step S414, a content request is sent to the AP server 40, and the routine proceeds to step S415. In step S415, whether the request has reached a time-out or was unsuccessful is determined. When it is determined that the request has reached a time-out or was unsuccessful, the routine proceeds to step S418, and in other cases the routine proceeds to step S416. In step S416, whether a normal response was received from the AP server 40 is determined. When it is determined that a normal response was received, the routine proceeds to step S417, and when it is determined that a normal response was not received, the routine proceeds to step S418.

In step S417, a content response is sent to the in-vehicle terminal 10, the flowchart of FIG. 13 is ended. In step S418, a request failed message containing the request failed part is sent to the in-vehicle terminal 10, and the flowchart of FIG. 13 is ended.

(Flowchart of Content Request of AP Server)

Figure 14:
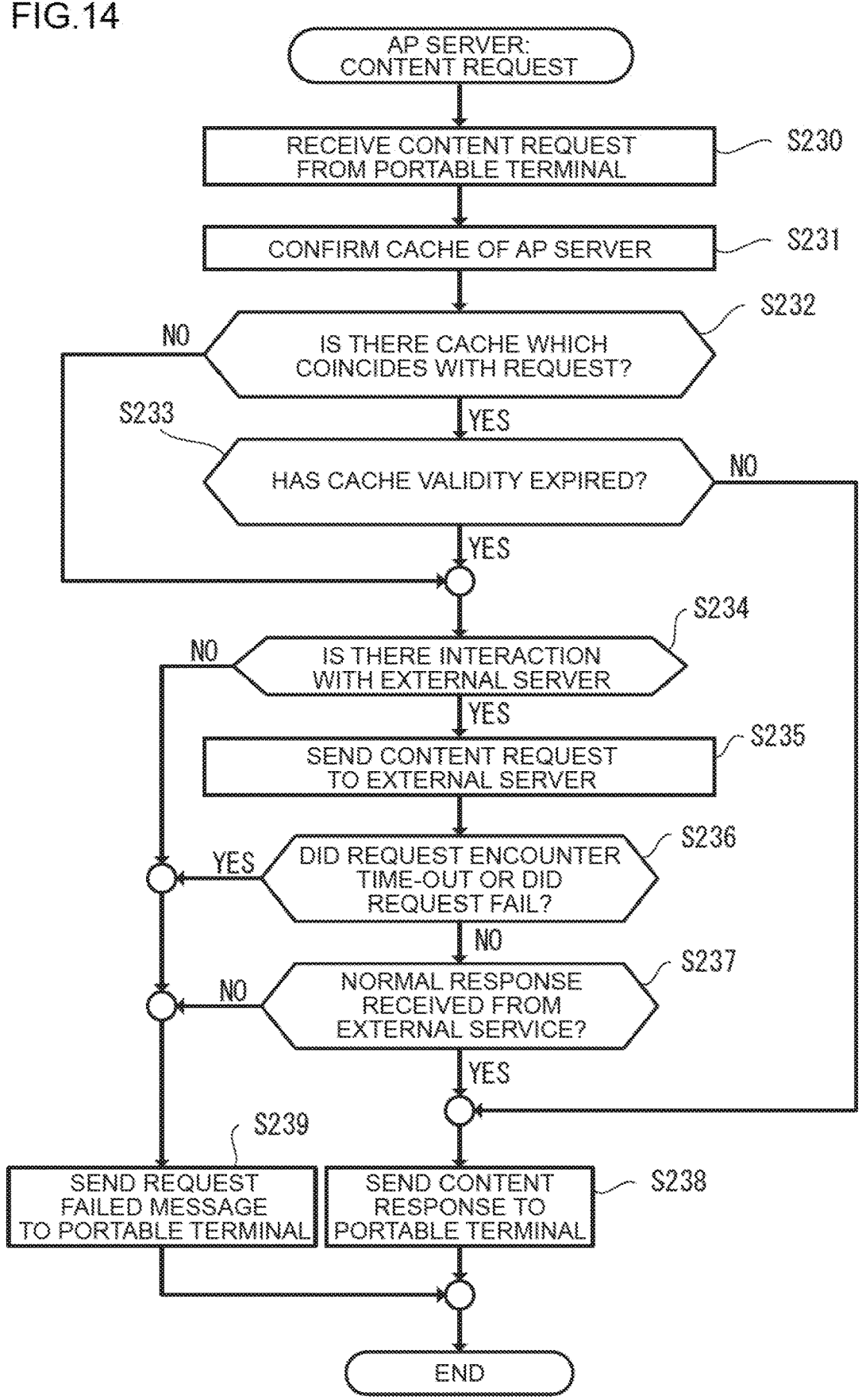
FIG. 14 is a flowchart showing a content request processing performed by the AP server.

FIG. 14 is a flowchart showing the content request processing performed by the AP server 40. The executing agent of the respective steps explained below is the CPU of the AP server control unit 43.

In step S230, a content request is received from the portable terminal 20, and the routine proceeds to step S231. In step S231, the content requested using the cache processing unit 49 is searched from the server cache 46a, and the routine proceeds to step S232.

In step S232, whether the content requested in step S230 exists in the server cache 46a is determined. When it is determined that the requested content exists in the server cache 46a, the routine proceeds to step S233, and when it is determined that the requested content does not exist in the server cache 46a, the routine proceeds to step S234. In step S233, whether the cache validity of the content has expired; that is, whether the cache validity has elapsed, is determined. When it is determined that the cache validity has expired, the routine proceeds to step S234, and when it is determined that the cache validity has not yet expired, the routine proceeds to step S238.

In step S234, whether there is any interaction with the external server 71 is determined using the interaction communication unit 48a. When it is determined that there is interaction with the external server 71, the routine proceeds to step S235, and when it is determined that there is no interaction with the external server 71, the routine proceeds to step S239.

In step S235, a content request is sent to the external server 71, and the routine proceeds to step S236. In step S236, whether the request has reached a time-out or was unsuccessful is determined. When it is determined that the request has reached a time-out or was unsuccessful, the routine proceeds to step S237. In step S237, whether a normal response was received from the external server 71 is determined. When it is determined that a normal response was received, the routine proceeds to step S238, and when it is determined that a normal response was not received, the routine proceeds to step S239.

In step S238, a content response is sent to the in-vehicle terminal 10, and the flowchart of FIG. 14 is ended. In step S239, a request failed message containing the request failed part is sent to the portable terminal 20, and the flowchart of FIG. 14 is ended.

According to the first embodiment of the present invention explained above, the following effects are yielded.

(1) A content delivery system 1 includes an in-vehicle terminal 10 and an AP server 40 that are connected via wireless communication between a portable terminal 20 and a base station 80. The AP server 40 includes a pre-sending unit, or a content pre-delivery unit 47, which identifies a content that is likely to be used by the in-vehicle terminal 10 in a dead spot where a communication status of the wireless communication is inferior (step S212, S213), and sends the identified content to the in-vehicle terminal 10 before a vehicle 5 mounted with the in-vehicle terminal 10 reaches the dead spot (step S217). The in-vehicle terminal 10 includes, an in-vehicle terminal storage unit, or a storage unit 16 including an in-vehicle cache 16a, which stores the content sent from the content pre-delivery unit 47.

Because the content delivery system 1 is configured as described above, contents to be used in a dead spot are stored in the storage unit 16 of the in-vehicle terminal 10, and the in-vehicle terminal 10 can use the contents even at locations where the communication status is inferior.

(2) A plurality of in-vehicle terminals 10 are connected to the AP server 40. The pre-sending unit, or the content pre-delivery unit 47, of the AP server 40 identifies the content that is likely to be used in the dead spot based on a past content usage history by the plurality of in-vehicle terminals 10 in steps S212 and S213.

Thus, it is possible to identify the content to be pushed to the in-vehicle terminal 10 based on the usage history of the contents of the plurality of in-vehicle terminals 10. For example, even in a dead spot where the vehicle 5 mounted with a certain in-vehicle terminal 10 passes through for the first time, the push delivery of the content can be received based on the usage history of the contents of other portable terminals 20.

(3) The in-vehicle terminal 10 includes an action history processing unit 18 which sends, to an action history analyzing server 50, an action history 16b related to a communication status of the wireless communication between the portable terminal 20 and the base station 60 and the position of the vehicle 5 when the content was received from the AP server 40 (step S80, S81). The content pre-delivery unit 47 of the AP server 40 identifies the content that is likely to be used in the dead spot by using a content acquisition table 55 storing, for each content, a communication status of the wireless communication and an access frequency based on the action history 16b sent from the action history processing unit 18.

Consequently, the content pre-delivery unit 47 can efficiently determine the content to be pushed to the portable terminal 20 by referring to the content acquisition table 55.

(4) The AP server 40 includes a route calculation unit 48b which calculates a route from a place of departure to a destination of the vehicle 5 (step S211). The content pre-delivery unit 47 of the AP server 40 identifies the content that is likely to be used by the in-vehicle terminal in the dead spot along the route calculated by the route calculation unit 48b, and deliveries the identified content to the in-vehicle terminal 10. Consequently, the content pre-delivery unit 47 can estimate the dead spot through which the vehicle 5 mounted with the in-vehicle terminal 10 will pass, and push the content to be used in the dead spot.

(5) The content delivery system 1 includes a portable terminal 20 which relays a communication between the in-vehicle terminal 10 and the AP server 40, and which moves together with the in-vehicle terminal 10, and a content providing server, or an external server 71, which provides a content according to a request from the AP server 40. The portable terminal 20 includes a portable terminal storage unit, or a storage unit 26 including a portable cache 26a, which stores the content sent from the content pre-delivery unit 47. The AP server 40 includes a server storage unit, or a storage unit 46 including a server cache 46a, which stores the content. The content pre-delivery unit 47 of the AP server 40 acquires the content from the external server 71 and stores the acquired content in one among the in-vehicle cache 16a, the portable cache 26a, and the server cache 46a.

Thus, it is possible to store the contents by using a plurality of caches.

(6) The content pre-delivery unit 47 of the AP server 40 determines whether to store the content in the storage unit 16, the storage unit 26 or the storage unit 46 based on a communication status of the wireless communication and/or a frequency that the content is used.

Thus, it is possible to determine the storage destination of the content based on the communication status of the wireless communication and/or the frequency that the content is used so that the probability that the content can be used will increase.

(7) The content pre-delivery unit 47 of the AP server 40 sets a priority of the content based on a communication status of the wireless communication and/or a frequency that the content is used by using the communication status of the content acquisition table 55 and the total evaluation score of the access frequency. The content is stored in the storage unit 16 when the priority of the content is high, the content is stored in the storage unit 26 when the priority of the content is moderate, and the content is stored in the storage unit 46 when the priority of the content is low.

Storage of the content in the in-vehicle cache 16a including the in-vehicle terminal 10 to use the content is the most preferable because communication is not required and the reading speed is fast. Nevertheless, because the in-vehicle cache 16a has a limited size, the next preferable method would be to store the content in the portable cache 26a of the portable terminal 20 mounted in the same vehicle 5. Moreover, even though there may be no failure in the wireless communication connecting the portable terminal 20 and the base station 60, there may be cases where a failure occurs in the external server 71 or a failure occurs in the communication between the external server 71 and the AP server 40. Thus, it would also be advantageous to store the content in the server cache 46a of the AP server 40. In summary, the in-vehicle cache 16a would be the most preferable storage destination of the content, followed by the portable cache 26a, and finally the server cache 46a.

Accordingly, because the content pre-delivery unit 47 is configured as described above, it is possible to store a content with a higher priority in a more preferable storage destination.

Modified Example 1

In the first embodiment, the action history processing unit 28 of the portable terminal 20 sent, to the in-vehicle terminal 10, the average value of the radio wave strength during the period that the content is being acquired upon acquiring a content from the external server 71. Nevertheless, the action history processing unit 28 may also send information of the radio wave strength to the action history analyzing server 50. In other words, it would be sufficient to integrate the information sent from the in-vehicle terminal 10 and the information sent from the portable terminal 20, and create the action history DB 54 in the action history analyzing server 50.

Furthermore, the information to be accumulated in the action history DB 54 may also be information that is sent from other terminals. For example, it is also possible to store the action history 16b in a memory card connected to the memory card interface 14 of the in-vehicle terminal 10, and connect the memory card to a PC (not shown) and send the action history 16b from the PC to the action history analyzing server 50 via the network 6.

Modified Example 2

In the first embodiment, while the action history analyzing unit 52 created the content acquisition table 55 without differentiating the type of wireless communication connecting the portable terminal 20 and the base station 60, consideration may be given to the classification of wireless communication. The expression "classification of wireless communication" is, for instance, the communication carrier, frequency, or communication method. Because the base station 60 used by the portable terminal 20 is generally provided individually for each communication carrier, the radio wave strength will differ for each communication carrier even in the same area. The influence from obstacles and the communication rate will differ depending on the frequency or communication method. Moreover, the access frequency may also differ for each communication carrier depending on the user's preference in selecting the communication carrier.

Figure 15:
FIG. 15 is a diagram showing an example, of a content acquisition table which gives consideration to wireless communication carriers.

FIG. 15 is a diagram showing an example of the content acquisition table 55a which gives consideration to the wireless communication carrier. As shown in FIG. 15, even when the content and the location of request are the same, the communication status and access frequency are different depending on the communication carrier. When the content acquisition table 55a is configured as shown in this diagram, there may be cases where the content is pushed only to the terminals using a specific communication carrier.

In order for the action history analyzing unit 52 to create the foregoing content acquisition table 55a, the following are changed from the first embodiment. In other words, the action history processing unit 28 of the portable terminal 20 conveys, to the in-vehicle terminal 10, information of the communication carrier in addition to the radio wave strength upon acquiring a content from the external server 71, and the in-vehicle terminal 10 stores the communication carrier by including it in the action history 16b.

Modified Example 3

In the first embodiment, the pushed content was stored in one location among the in-vehicle cache 16a, the portable cache 26a, and the server cache 46a. Nevertheless, the content may also be redundantly stored in a plurality of locations For example, upon sending a content to the portable terminal 20, the content pre-delivery unit 47 of the AP server 40 may store such content in the server cache 46a.

According to this modified example 3, when a certain cache becomes unavailable, another cache may be used.

Modified Example 4

In the first embodiment, the pushed content was stored in one location among the in-vehicle cache 16a, the portable cache 26a, and the server cache 46a. Nevertheless, it would be sufficient so as long the content is stored in at least one location. For example, the AP server 40 does not need to include the server cache 46a, and the pushed content may be stored in the in-vehicle cache 16a or the portable cache 26a.

Modified Example 5

The content pre-delivery unit 47 may push only a part of a content, or push another part of a content to another terminal. For example, data that is essential to the content may be pushed to the in-vehicle terminal 10 and stored in the in-vehicle cache 16a, data that is not essential to the content but required at a high frequency may be pushed to the portable terminal 20 and stored in the portable cache 26a, and data that is required at a low frequency may be stored in the server cache 46a of the AP server 40.

Modified Example 6

In the first embodiment, the action history analyzing unit 52 evaluated the priority of the content based on the communication status and access frequency. Nevertheless, the priority of the content may also be evaluated without giving consideration to the access frequency and download speed. In other words, it would be sufficient to evaluate the priority of the content by giving consideration to at least the radio wave strength.

Modified Example 7

In the first embodiment, the content pre-delivery unit 47 calculated the route based on the place of departure and the destination received from the in-vehicle terminal 10, and determined the content to be pushed. Nevertheless, the content may also be pushed when the user does not set the destination. For example, the content may be pushed by estimating the travel route based on the history of the travel route that the in-vehicle terminal 10 passed through in the past, the travel history of other in-vehicle terminals 10, and the current location of the in-vehicle terminal 10. Furthermore, when the current location of the in-vehicle terminal 10 deviates from the travel route, the content may be pushed by re-estimating the travel route.

In order to realize the above, the in-vehicle terminal 10 records the current location output by the GNSS receiver 4 in prescribed intervals, and sends information related to the travel route to the AP server 40. The AP server 40 accumulates information related to the travel route sent from the in-vehicle terminal 10, and uses the accumulated information for estimating the travel route.

Modified Example 8

In the first embodiment, the content pre-delivery unit 47 calculated the route based on the place of departure and the destination received from the in-vehicle terminal 10, and determined the content to be pushed. Nevertheless, it is also possible to push the content by calculating a dead spot within a predetermined distance, for instance, within a radius of 10 km, from the current location of the in-vehicle terminal 10, and referring to the content acquisition table 55 without calculating the route.

In other words, once the current location of the in-vehicle terminal 10 is received, the content in which a dead spot within a predetermined distance from the current location is included in the location of request is extracted from the content acquisition table 55, and the extracted content is pushed.

According to this modified example 8, the following effects are yielded.
(1) The content pre-delivery unit 47 of the AP server 40 identifies the content that is likely to be used by the in-vehicle terminal 10 in the dead spot in a vicinity of a position of the vehicle, and sends the identified content to the in-vehicle terminal 10.

Thus, the content to be used in the dead spot around the in-vehicle terminal 10 is pushed even when the user does not designate the destination. Furthermore, by repeating this push delivery in predetermined intervals or for each predetermined distance traveled by the vehicle, it is possible to use the pushed content upon passing through any of the dead spots.

Modified Examples 9

Access control as a cache may also be imposed on the content to be pushed. When access control has been imposed, an inquiry is made to the external server 71 regarding the possibility of usage prior to using the content, and the content is used upon receiving a response from the external server 71 to the effect that the content may be used, or upon acquiring a new content. Whether or not access control has been set is also pushed together with the content in the same manner as its cache validity.

In the foregoing case, the flowchart in the first embodiment is changed as follows. A positive determination is made when the cache validity has elapsed or when access control has been imposed and a negative determination is made when the cache validity has not elapsed and no access control has been imposed in step S313 of FIG. 12, step S413 of FIG. 13, and step S233 of FIG. 14. When a positive determination is made, the possibility of using the content is inquired in substitute for requesting the content in step S314 of FIG. 12, step S414 of FIG. 13, and step S235 of FIG. 14.

Modified Example 10

In the first embodiment, the time-out time in the content request processing of the in-vehicle terminal 10, the portable terminal 20, and the AP server 40 was not prescribed. Nevertheless, the time-out time may also be set according to the following relationship.

The time-out time in step S315 of FIG. 12 is longer than the time-out time in step S415 of FIG. 13, and the time-out time in step S415 of FIG. 13 is longer than the time-out time in step S236 of FIG. 14. By setting the time-out time according to the foregoing relationship, for instance, it is possible to prevent the determination that the portable terminal 20 has reached a time-out during a period that the request processing of the AP server 40 has not yet been completed.

Modified Example 11

In the first embodiment, the content was configured from information and an output program. Nevertheless, the content may also be configured only from information that does not contain any output program. In the foregoing case, the content is used by using the output program equipped in the in-vehicle terminal 10.

Modified Example 12

In the first embodiment, the content was executed by the in-vehicle terminal 10. Nevertheless, the content may also be executed by the portable terminal 20, and the image and sound of the content may be transferred to the in-vehicle terminal 10 and output from the in-vehicle terminal 10. In the foregoing case, a content having an evaluation score of 2 points is stored in the portable cache 26a of the portable terminal 20, and a content having an evaluation score of 3 points or 4 points is stored in the in-vehicle cache 16a of the in-vehicle terminal 10.

Modified Example 13

In the content request processing, the processing may also be advanced by determining that the communication has failed without waiting for a time-out. For example, in step S415 of FIG. 13, the time series variation of the radio wave strength is monitored, and, when it is predicted that the radio wave strength will become extremely weak or when it is predicted that the vehicle will enter a no service area, it is determined that the request has failed without waiting for a time-out, and the routine proceeds to step S418. In step S236 of FIG. 14, it is determined that the request has failed when the ratio of communication error with the external server 71 based on the interaction communication unit 48a exceeds a predetermined ratio, and the routine proceeds to step 3239.

Modified Example 14

The content pre-relay unit 27 of the portable terminal 20 may request the extension of the time-out time to the in-vehicle terminal 10 when it is not possible to currently connect to the network 7, but it is determined that it will be possible to connect to the network 7 in a short while, based on the current location and travel information of the vehicle, and one's own action history information. When the in-vehicle terminal 10 returns a response to the effect of extending the time-out time to the portable terminal 20, the portable terminal 20 communicates with the AP server 40 upon standing by until communication with the network 7 is enabled.

Modified Example 15

The content pre-delivery unit 47 may restrict the contents to be pushed in consideration of the volume of the content. Because the storage unit 16 of the in-vehicle terminal 10 and the storage unit 26 of the portable terminal 20 have a relatively small volume, it is difficult to store contents having a large information volume. Thus, the content pre-delivery unit 47 may refrain from pushing any content having a predetermined information volume or larger. Moreover, it is also possible to restrict the contents to be pushed based on the classification of the content, rather than based on the information volume of the content. For example, because contents containing video data and search data of the vehicle travel route tend to have an extremely large information volume, the push delivery of such contents to the in-vehicle terminal 10 and the portable terminal 20 may be restricted.

Modified Example 16

The content pre-delivery unit 47 may also evaluate the cache validity set in the content by giving consideration to the communication time between networks. In other words, the AP server 40 analyzes the communication logs output by the in-vehicle terminal 10, the portable terminal 20, and the AP server 40 to comprehend the communication time between the respective networks, and changes the cache validity to be shorter than the original value according to the communication time between the respective networks. The relationship of the push delivery destination and the cache validity will be as follows; specifically, previously set validity≥validity evaluated for the AP server 40≥validity evaluated for the portable terminal 20≥validity evaluated for the in-vehicle terminal 10. Furthermore, the cache validity may also be evaluated to be shorter by using information such as the present location or destination of the vehicle. Moreover, the cache validity may be evaluated by combining the foregoing information with the communication time.

Modified Example 17

In the first embodiment, the action history 16b sent from a plurality of in-vehicle terminals 10 was accumulated in the action history DB 54 of the action history analyzing server 50. Nevertheless, the action history 16b sent from only one in-vehicle terminal 10 may also be accumulated. Moreover, the action history analyzing server 50 may include a plurality of action history DBs 54, and the action history 16b may be accumulated in a different action history DB 54 for each in-vehicle terminal 10.

Modified Example 18

In the first embodiment, the AP server 40 and the action history analyzing server 50 were respectively explained as one server device. Nevertheless, the AP server 40 and the action history analyzing server 50 may also be respectively configured from a plurality of servers, and the plurality of servers as a whole may exhibit the functions of the AP server 40 and the action history analyzing server 50.

The division of functions between the AP server 40 and the action history analyzing server 50 may be changed, and, for instance, the AP server 40 may include the action history DB 54. In other words, so as long as the data center 30 includes the functions of the application server 40 and the action history analyzing server 50, the hardware configuration and the division of functions are not limited to those described in the first embodiment.

Modified Example 19

The content delivery system 1 may also be configured from only the AP server 40 and the in-vehicle terminal 10. In the foregoing case, the AP server 40 additionally includes the functions of the action history analyzing server 50 and the external server 71, and the in-vehicle terminal 10 additionally includes the functions of the portable terminal 20.

In the foregoing case, the AP server 40 additionally includes the action history DB 54, the content acquisition table 55, and the contents, but does not include the server cache 46a. The in-vehicle terminal 10 additionally includes an external communication interface 24 for performing wireless communication with the base station 60.

Modified Example 20

Figure 16:
FIG. 16 is a diagram showing an example of a content acquisition table which gives consideration to cache destinations.

The content acquisition table may also include a column for recording the device where the content is to be stored based on push delivery (hereinafter referred to as the "cache destination"). FIG. 16 is a diagram showing an example of the content acquisition table 55b including a cache destination column.

In the foregoing case, after performing the processing explained in the first embodiment, the action history analyzing unit 52 determines the cache destination based on the total evaluation score of "communication status" and "access frequency". For example, the cache destination is set to "in-vehicle terminal" when the evaluation score is 2 points, set to "portable terminal" when the evaluation score is 3 points or 4 points, set to "server" when the evaluation score is 5 points, and set to "none" when the evaluation score is 6 points.

The content pre-delivery unit 47 of the AP server 40 refers to the "cache destination" column of the content acquisition table 55b and determines the operation to be performed. In other words, when the "cache destination" of the corresponding content is "in-vehicle terminal" and "portable terminal", the content is pushed to the portable terminal 20, when the "cache destination" of the corresponding content is "server", the content is stored in the server cache 46a of the AP server 40, and when the "cache destination" of the corresponding content is "none", no processing is performed.

Second Embodiment

The second embodiment of the content delivery system according to the present invention is now explained. In the ensuing explanation, the same reference numeral is given to the same constituent element as the first embodiment, and differences between the first embodiment and the second embodiment will be mainly explained. Points that are not specifically explained are the same as the first embodiment. This embodiment differs from the first embodiment mainly with respect to the point that the contents stored in the in-vehicle cache 16a and the portable cache 26a are deleted. Upon pushing contents to the in-vehicle terminal 10 and the portable terminal 20, the AP server 40 adds, to the content, and sends the communication status and the access frequency of the content acquisition table 55.

When the available space of the storage unit 16 and the storage unit 26 falls below a predetermined threshold, the cache processing unit 19 of the in-vehicle terminal 10 and the cache processing unit 29 of the portable terminal 20 perform the following processing to delete the contents stored in the in-vehicle cache 16a and the portable cache 26a. Because the following processing is the same for both the cache processing unit 19 and the cache processing unit 29, only the processing of the cache processing unit 19 is explained.

When the available space of the storage unit 16 falls below a predetermined threshold, the cache processing unit 19 refers to the communication status and the access frequency added to the cache, and deletes the cache in which the sum of evaluation scores of the communication status and the access frequency is greatest. If the sum of evaluation scores is the same, the content having a greater evaluation value of the communication status or access frequency is preferentially deleted. The content to be deleted may also be determined by referring to only the evaluation score of the communication status or the evaluation score of the access frequency.

According to the second embodiment of the present invention explained above, the following effects are yielded.
(1) The in-vehicle terminal 10 includes a cache deletion unit, or a cache processing unit 19, which determines a content to be deleted from the in-vehicle terminal storage unit based on a communication status of the wireless communication and/or a frequency that the content is used.

Thus, the in-vehicle cache 16a and the portable cache 26a can be managed based on the communication status and the access frequency. As the method of switching caches, generally known are LRU (Least Recently Used), LFU (Least Frequently Used), and deletion of contents from the oldest cache generation time. Nevertheless, these methods focus on the usage frequency of the contents stored in the storage unit 16 and the storage unit 26, and do not give consideration to the communication status and access frequency.

The respective embodiments and modified examples explained above may also be respectively combined.

Note that the various embodiments and modified examples explained above are merely illustrative, and the present invention is not limited to the subject matter of such embodiments and modified examples. In other words, other modes considered to fall within the technical scope of the present invention are also covered by the present invention.

The disclosure of the following priority application is incorporated herein by reference. Japanese Patent Application No. 2015-107091 (filed on May 27, 2015)

REFERENCE SIGNS LIST

1 . . . Content delivery system
10 . . . In-vehicle terminal
16a . . . In-vehicle cache
16b . . . Action history
17 . . . Content pre-acquisition unit
18 . . . Action history processing unit
19 . . . Cache processing unit
20 . . . Portable terminal
26a . . . Portable cache
27 . . . Content pre-relay unit
29 . . . Cache processing unit
40 . . . Application server
43 . . . AP server control unit
44 . . . Communication interface
46a . . . Server cache
47 . . . Content pre-delivery unit
48b . . . Route calculation unit
49 . . . Cache processing unit
52 . . . Action history analyzing unit
55 . . . Content acquisition table
71 . . . External server

The invention claimed is:

1. A content delivery system comprising:
an in-vehicle terminal;
a content delivery server connected via wireless communication;
a portable terminal which relays a communication between the in-vehicle terminal and the content delivery server, and which moves together with the in-vehicle terminal; and
a content providing server which provides a content according to a request from the content delivery server,
wherein the content delivery server comprises:
a pre-sending unit which identifies a content that is likely to be used by the in-vehicle terminal in a dead spot where a communication status of the wireless communication is inferior, and sends the identified content to the in-vehicle terminal before a vehicle mounted with the in-vehicle terminal reaches the dead spot,
wherein the in-vehicle terminal comprises:
an in-vehicle terminal storage unit which stores the content sent from the pre-sending unit,
wherein the portable terminal comprises a portable terminal storage unit which stores a content sent from the pre-sending unit,
wherein the content delivery server further comprises a server storage unit which stores a content, and
wherein the pre-sending unit of the content delivery server acquires a content from the content providing server and stores the acquired content in one among the server storage unit, the portable terminal storage unit and the in-vehicle terminal storage unit.

2. The content delivery system according to claim 1, wherein the pre-sending unit of the content delivery server determines whether to store the content in the server storage unit, the portable terminal storage unit or the in-vehicle terminal storage unit based on a communication status of the wireless communication and/or a frequency that the content is used.

3. The content delivery system according to claim 2, wherein the pre-sending unit of the content delivery server:
sets a priority of the content based on a communication status of the wireless communication and/or a frequency that the content is used; and
stores the content in the in-vehicle terminal storage unit when a priority of the content is high, stores the content in the portable terminal storage unit when a priority of the content is moderate, and stores the content in the server storage unit when a priority of the content is low.

4. The content delivery system according to claim 1, wherein the in-vehicle terminal further comprises a cache deletion unit which determines a content to be deleted from the in-vehicle terminal storage unit based on a communication status of the wireless communication and/or a frequency that the content is used.

5. A content delivery server which configures the content delivery system according to claim 1.

6. An in-vehicle terminal which configures the content delivery system according to claim 1.

7. A content delivery method executed by a content delivery system that comprises: a content delivery server including a server storage unit which stores a content an in-vehicle terminal connected with the content delivery server via wireless communication and including an in-vehicle terminal storage unit which stores a content sent from the content delivery server; a portable terminal which relays a communication between the in-vehicle terminal and the content delivery server, which moves together with the in-vehicle terminal, and which includes a portable terminal storage unit which stores a content sent from the content delivery server; and a content providing server which provides a content according to a request from the content delivery server, the content delivery method comprising:
- a step in which the content delivery server identifies a content that is likely to be used by the in-vehicle terminal in a dead spot where a communication status of the wireless communication is inferior, and sends the identified content to the in-vehicle terminal before a vehicle mounted with the in-vehicle terminal reaches the dead spot; and
- a step in which the content delivery server acquires a content from the content providing server and stores the acquired content in one among the server storage unit, the portable terminal storage unit and the in-vehicle terminal storage unit.

8. The content delivery method according to claim 7, further comprising:
- a step in which the content delivery server determines whether to store the content in the server storage unit, the portable terminal storage unit or the in-vehicle terminal storage unit based on a communication status of the wireless communication and/or a frequency that the content is used.

9. The content delivery method according to claim 8, further comprising:
- a step in which the content delivery server:
    - sets a priority of the content based on a communication status of the wireless communication and/or a frequency that the content is used; and
    - stores the content in the in-vehicle terminal storage unit when a priority of the content is high, stores the content in the portable terminal storage unit when a priority of the content is moderate, and stores the content in the server storage unit when a priority of the content is low.

10. The content delivery method according to claim 7, further comprising:
- a step in which the in-vehicle terminal determines a content to be deleted from the in-vehicle terminal storage unit based on a communication status of the wireless communication and/or a frequency that the content is used.

* * * * *